United States Patent
Sheppard

(10) Patent No.: US 12,229,098 B2
(45) Date of Patent: Feb. 18, 2025

(54) METHODS AND APPARATUS TO VIRTUALLY ESTIMATE CARDINALITY WITH GLOBAL REGISTERS

(71) Applicant: The Nielsen Company (US), LLC, New York, NY (US)

(72) Inventor: Michael R. Sheppard, Holland, MI (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 18/148,337

(22) Filed: Dec. 29, 2022

(65) Prior Publication Data

US 2024/0143568 A1     May 2, 2024

Related U.S. Application Data

(60) Provisional application No. 63/420,422, filed on Oct. 28, 2022.

(51) Int. Cl.
    *G06F 16/22*     (2019.01)
(52) U.S. Cl.
    CPC ................ *G06F 16/2228* (2019.01)
(58) Field of Classification Search
    CPC .................................. G06F 16/2228
    See application file for complete search history.

(56) References Cited

U.S. PATENT DOCUMENTS

| | | |
|---|---|---|
| 2012/0095958 A1 | 4/2012 | Pereira |
| 2017/0103417 A1 | 4/2017 | Nguyen et al. |
| 2018/0189550 A1 | 7/2018 | McCombe |
| 2021/0034665 A1 | 2/2021 | Cremer |
| 2021/0248629 A1 | 8/2021 | Sullivan et al. |
| 2021/0357403 A1* | 11/2021 | Dash ............... G06F 16/24532 |
| 2021/0406240 A1 | 12/2021 | Sheppard et al. |
| 2022/0036390 A1 | 2/2022 | Sheppard et al. |
| 2023/0004997 A1 | 1/2023 | Sheppard et al. |
| 2023/0120709 A1 | 4/2023 | Sheppard |

OTHER PUBLICATIONS

Dao et al., "Minimizing Noise in HyperLogLog-Based Spread Estimation of Multiple Flows," 2022, 12 pages.

(Continued)

*Primary Examiner* — Van H Oberly

(57) ABSTRACT

Methods, apparatus, systems, and articles of manufacture to virtually estimate cardinality with global registers are disclosed. An example apparatus includes processor circuitry to s assign subsets of a sample dataset to a shared global register array, the shared global register array having a first number of registers, the sample dataset selected from a reference dataset of media assets; identify a virtual register array from the shared global register array that includes data elements associated with a label value, the virtual register array including a second number of registers less than the first number of registers; determine a maximum rank value of the label value across the virtual register array; and calculate a cardinality estimate of the label value across the virtual register array based on the second number of registers and the maximum rank value.

21 Claims, 8 Drawing Sheets

(56) References Cited

OTHER PUBLICATIONS

Flajolet et al., "HyperLogLog: the analysis of a near-optimal cardinality estimation algorithm," 2007 Conference on Analysis of Algorithms, AofA 07, 2007, 20 pages.

Xiao et al., "Hyper-Compact Virtual Estimators for Big Network Data Based on Register Sharing," Sigmetrics, Jun. 2015, 12 pages.

Goldberg, Lydia Koujianou, "Sketch-Based Cardinality Estimation Algorithms," Bachelor's thesis, Harvard College, 2018, 50 pages.

Egert et al., Privately Computing Set-Union and Set-Intersection Cardinality via Bloom Filters, Information Security and Privacy, Jan. 2015, pp. 413-430.

United States Patent and Trademark Office, Non-final office action dated Apr. 1, 2024 in U.S. Appl. No. 17/877,671, 12 pages.

* cited by examiner

METHODS AND APPARATUS TO VIRTUALLY ESTIMATE CARDINALITY WITH GLOBAL REGISTERS

RELATED APPLICATION

This patent claims the benefit of U.S. Provisional Patent Application No. 63/420,422, which was filed on Oct. 28, 2022. U.S. Provisional Patent Application No. 63/420,422 is hereby incorporated herein by reference in its entirety. Priority to U.S. Provisional Patent Application No. 63/420,422 is hereby claimed.

FIELD OF THE DISCLOSURE

This disclosure relates generally to cardinality estimation and, more particularly, to virtually estimating cardinality with global registers.

BACKGROUND

Cardinality estimation is one of the active fields of research for computer science and business. Consider a multiset of entries, {a, a, b, c, b}, where each unique entry may appear multiple times. The count-distinct problem is to determine the number of distinct entries in the multiset, in this case three. The number of unique entries is also known as cardinality.

Figure 1:
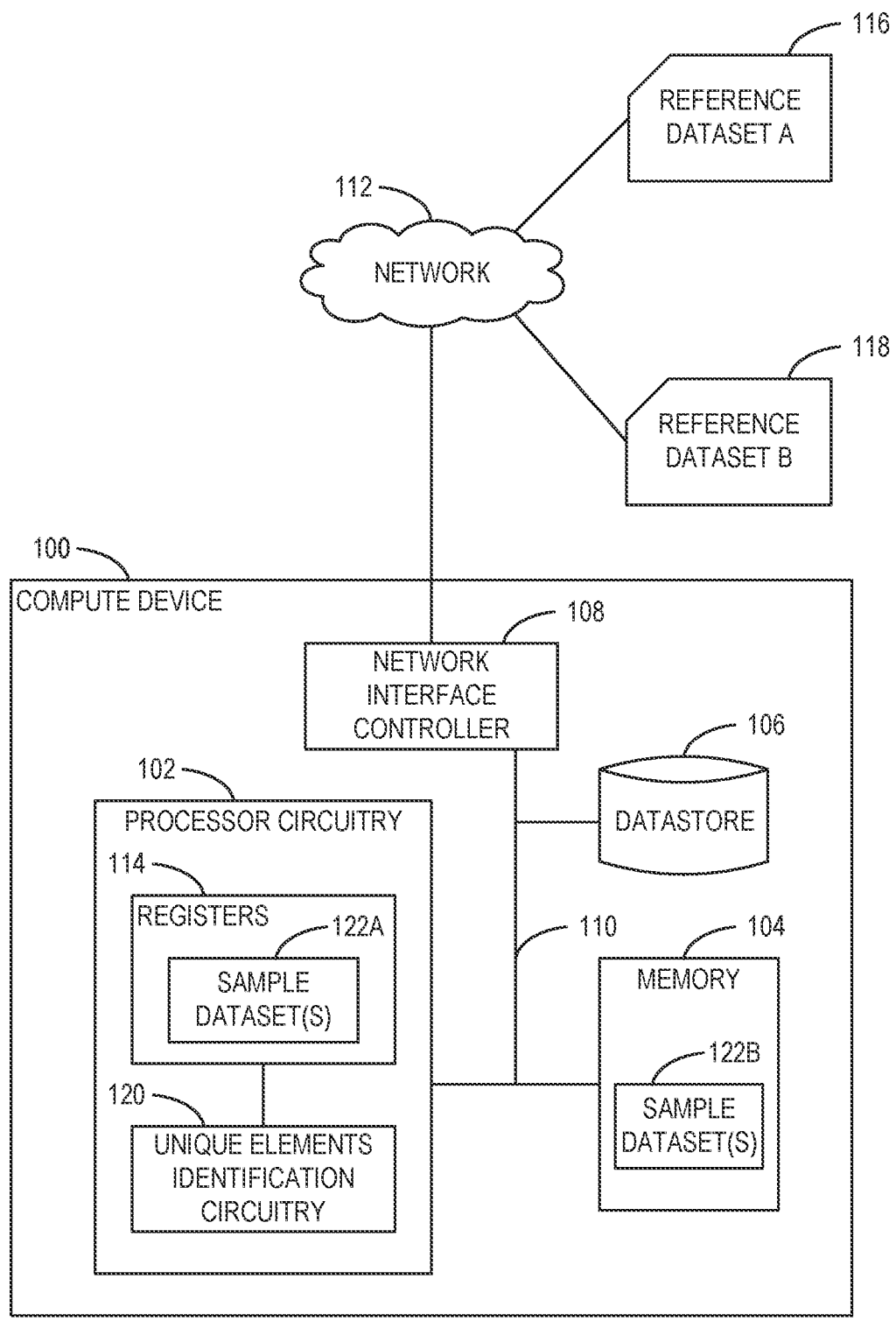
FIG. 1 is a block diagram of an example system for virtually estimating the cardinality of datasets with global registers.

In general, the same reference numbers will be used throughout the drawing(s) and accompanying written description to refer to the same or like parts. The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

As used herein, the term "media" includes any type of content and/or advertisement delivered via any type of distribution medium. Thus, media includes television programming or advertisements, radio programming or advertisements, podcasts, movies, web sites, streaming media, etc.

Example methods, apparatus, and articles of manufacture disclosed herein monitor media presentations at media devices. Such media devices may include, for example, Internet-enabled televisions, personal computers, Internet-enabled mobile handsets (e.g., a smartphone), video game consoles (e.g., Xbox®, PlayStation®), tablet computers (e.g., an iPad®), digital media players (e.g., a Roku® media player, a Slingbox®, etc.), etc.

In some examples, media monitoring information is aggregated to determine ownership and/or usage statistics of media devices, determine the media presented by the media devices, determine audience ratings, determine relative rankings of usage and/or ownership of media devices, determine types of uses of media devices (e.g., whether a device is used for browsing the Internet, streaming media from the Internet, etc.), and/or determine other types of media device information. In examples disclosed herein, monitoring information includes, but is not limited to, one or more of media identifying information (e.g., media-identifying metadata, codes, signatures, watermarks, and/or other information that may be used to identify presented media), application usage information (e.g., an identifier of an application, a time and/or duration of use of the application, a rating of the application, etc.), identifying information (e.g., demographic information, a user identifier, a panelist identifier, a username, etc.), etc.

Media monitoring entities (e.g., The Nielsen Company (US), LLC, etc.) desire knowledge regarding how users interact with data provided by media outlets. Media outlets may include websites, stores, streaming entities (e.g., Netflix®, etc.) and devices (e.g., smartphones, televisions, etc.), among other entities. In some examples, media monitoring entities monitor media presentations made at the media devices to, among other things, monitor exposure to advertisements, determine advertisement effectiveness, determine user behavior, identify purchasing behavior associated with various demographics, etc.

Media monitoring entities can generate media reference datasets that can include one or more labels (e.g., references, characteristic attributes) associated with ones of entries in the media reference datasets. For example, a label may be an unhashed signature, a hashed signature, or a watermark, among other identifying information. In examples disclosed herein, the labels may be generated by a media monitoring entity (e.g., at a media monitoring station (MMS), etc.) by monitoring a media source feed, identifying any encoded watermarks and determining signatures associated with the media source feed. In some examples, a media monitoring entity can hash the determined signatures. Additionally or alternatively, media monitoring entities generate reference signatures for downloaded reference media (e.g., from a streaming media provider), reference media transmitted to a media monitoring entity from one or more media providers, etc. As used herein, a "media asset" refers to any individual, collection, or portion/piece of media of interest (e.g., a commercial, a song, a movie, an episode of television show, etc.). Media assets can be identified via unique media identifiers (e.g., a name of the media asset, a metadata tag, etc.). Media assets can be presented by any type of media presentation method (e.g., via streaming, via live broadcast, from a physical medium, etc.). In examples disclosed herein, a media reference dataset may be stored in database storage, such as a cloud storage service (e.g., Amazon Web Services®, etc.).

The example media reference dataset can be compared (e.g., matched, etc.) to media monitoring data in the form of data entries (e.g., the media information) and associated labels (e.g., watermarks, unhashed signatures, hashed signatures, etc.) gathered by media meter(s) to allow crediting of media exposure. Monitored media can be credited using one, or a combination, of watermarks, unhashed signatures, hashed signatures, and/or other label types. In some examples, media monitoring entities may compare media monitoring data with a media reference dataset to match labels. In some examples, the media monitoring data may be gathered (e.g., captured, recorded) from data transmissions on a network as an aggregation of data stored in one or more databases. Such example gathered media monitoring database(s) also may be stored in cloud storage services or elsewhere.

In some examples, the media reference dataset and/or the media monitoring data may include duplicate entries of reference media assets. In such examples, the media monitoring entities may determine the number of unique entries in the reference dataset for use in crediting media exposure, identifying viewership of media, etc. In other examples, large datasets may be analyzed for unique customers, users, values, and other statistics in the fields of search engines, website marketing, and network deployments, among many other large dataset usage models. In such examples, a label may be used as an identifier of data elements in the dataset. For example, in a search engine, a label of a dataset may include a key word, where grouping elements in the dataset may be based on the value of the key word. When the entries in a large dataset are grouped based on the values of a label, estimating the cardinality for a specific value of the label is complex. For example, a search engine company may want to know how many unique individuals search for a specific key word (e.g., a specific value of the label) or a large online retailer may want to know how many unique visitors they attract across their suite of websites (e.g., a visitor identifier (ID) may be used as the label). In other examples, a networking company may want to know how much networking traffic flow of a certain type or about a certain subject occurs during a measurement period or a cyber security firm may monitor the diversity of patterns in cyber-attacks (e.g., pattern values may be utilized as label values).

Returning to the audience measurement example, it is important to know the number of unique users/visitors/audience members across different labels, each representing a unique media asset. For example, a first commercial may be identified by label #1 and a second commercial may be identified by label #2, and a media monitoring entity may track a comparison of unique audience member views of commercial #1 (e.g., label #1, media asset #1) against unique audience member views of commercial #2 (e.g., label #2, media asset #2). If a first audience member watches commercial #1 four times and commercial #2 one time, the views of commercial #1 may appear to be four times as many as the views of commercial #2 unless cardinality of the commercial #1 and commercial #2 views is determined, which would show one unique audience member view for each of the two commercials. In some examples, tracked media assets may not only correspond to many different individual commercials, television programs, streaming content, etc., but may also represent smaller time segments of such commercials, television programs, streaming content, etc. Additionally, the number of audience members may grow quite large if the media assets are exposed to viewers across multiple geographic regions (e.g., states and/or countries). Thus, when many media assets are tracked for unique views, the cardinality determination across media assets becomes a complex problem.

Example techniques disclosed herein implement a HyperLogLog (HLL) algorithm to determine a probabilistic estimate of the number of distinct elements/entries (e.g., cardinality) in very large databases while using minimal memory. The cardinality estimation that HLL yields can be used to analyze entries (e.g., data elements) of a large dataset (e.g., a media reference dataset). In the HLL algorithm, a maximum value (or maximum rank) is determined in a dataset within a register based on the position of a first leftmost '1.' A usage of the geometric distribution in HLL is a consequence of using the position of the leftmost 1 in the binary representation of the hashed data as the statistic of interest. For example:

rank=1: 1[other bits]—50% of the time
rank=2: 01[other bits]—25% of the time
rank=3: 001[other bits]—12.5% of the time The probability that the rank is equal to k is $$\left(\frac{1}{2}\right)^k,$$

which is the geometric distribution. Within each register the largest rank is recorded.

Using HLL, the cardinality of a multiset of uniformly distributed random numbers can be estimated by calculating the maximum value of leading zeros in the binary representation of each number in the set. In some examples, when the maximum number of leading zeros observed in the set is n, an estimate for the number of distinct elements in the set is $2^n$. In some examples, the HLL algorithm can be summarized as the following: (1) HLL partitions a dataset into m mutually exclusive registers of roughly equal size to reduce variance, (2) calculate the maximum rank (e.g., maximum number of leading zeros) within each register, (3) determine the harmonic mean of the maximum ranks with a multiplicative bias correction factor, and (4) produce a final cardinality estimate of the dataset.

The HLL algorithm includes two primary operations: an add operation and a count operation. The add operation is used to add a new element to each subset M[j] of a register array M of m registers. In some examples, the new elements introduced to each subset M[j] are the maximum rank value of the corresponding register. The count operation of the HLL algorithm includes computing the harmonic mean of the m registers and multiplying a constant by the harmonic mean to determine an estimate N of the cardinality.

For HLL, an example global register array M of length m may be used in the cardinality estimation for a dataset. Example techniques disclosed herein use a variant of HLL called virtual HyperLogLog (vHLL) in which an amount of memory for recording (e.g., tracking) multiple labels is reduced by sharing registers among the global array M. In some examples, within the m global registers, a subset of s global registers (where s<<m) may be uniformly sampled without replacement for each label and without allocating new memory for the s registers. Uniformly sampled refers to an equal likelihood for each of the m global registers to be sampled into the subset of s global registers by an entity (e.g., a computing device). Furthermore, sampling without replacement refers to a condition that the entity cannot choose the same register twice. As such, all the registers in the subset of s global registers are distinct. This ensures that each label has exactly s out of m elements chosen, wherein the randomness refers to which of the m registers are chosen for the subset of s registers. Thus, the entity chooses s distinct registers for each label.

For example, if m=100 and s=5, label A may use registers {6, 13, 53, 63, 98} while label B uses registers {24, 53, 73, 80, 97}, and so on. In some examples, these are referred to as virtual registers as no new memory is allocated/needed. In some examples, all register subsets per label are register subsets of M which has already been allocated in memory. Additionally, in some examples, register sharing across labels is permitted. In the above example, register 53 was utilized for both label A and label B. In some examples, sharing registers across labels reduces memory but may lead to increased noise when cardinality of a label in a dataset is estimated.

As described above, within a label of interest one or more of its registers may be shared with other labels not of interest. In some examples, for any particular register which may be used, the maximum observed rank (e.g., a maximum value of a count of a label) is a maximum observed rank across all labels which share that register. Examples of implementations of such a rule among labels that share registers may produce noise in the rank values of the label of interest. For example, if label A is of interest, if label A and label B share a particular register, and if the maximum rank of label B for a particular register is greater than the maximum rank of label A, then the maximum observed rank (e.g., the cardinality recorded) is that of label B, overwriting the maximum rank of label A.

While the global array of registers is represented by M, a virtual array of registers $M_f$ is used for the cardinality estimation of label f. In other words, $M_f$ is a subset of registers from M used for a virtual estimate of the cardinality of label f. The true unknown cardinality of label f is represented by $n_f$ and can be determined based on (i) n, the true cardinality among all the labels in M and (ii) ns, the cardinality using $M_f$ for label f, that also includes the noise.

Following this notation, if n is the true cardinality of all the labels, and if $n_f$ is the true cardinality of label f, then $n-n_f$ represents the cardinality of the noise for all labels. The vHLL algorithm assumes that the noise for all labels is distributed equally across the m registers and that the noise for label f across the s registers are proportional to the noise for all labels. As such, the estimated noise for label f can be determined based on the difference between the measured cardinality (ns) of label f that includes the noise and the true cardinality ($n_f$) of the label f that does not include the noise. In some examples, the estimate of the noise for label f may be implemented as a single formula (example Equation 1).

Estimate of Noise of Label f.

$$n_s - n_f = \frac{s}{m}(n - n_f). \qquad \text{Equation 1}$$

The true values of Equation 1 can be substituted with corresponding point estimates (e.g., the true cardinality of label f ($n_f$) is substituted by the estimated cardinality of label f(($\hat{n}_f$)). Then, Equation 1 can be solved for the estimated cardinality of label f to derive a vHLL cardinality formula (example Equation 2).

Estimate of Cardinality of Label f.

$$\hat{n}_f = \left(\frac{m}{m-s}\right)\hat{n}_s - \left(\frac{s}{m-s}\right)\hat{n}. \qquad \text{Equation 2}$$

For the example Equation 2, the estimates $\hat{n}_s$ and $\hat{n}$ can be calculated using the HLL algorithm on the virtual array of registers $M_f$ and the physical array of registers M, respectively. However, because the vHLL algorithm assumes constant noise across the registers, the vHLL algorithm is not sufficiently accurate on larger scales (e.g., multiple labels sharing multiple registers in the global array M, multiple network flows with diverse flow distributions, etc.).

In examples disclosed herein, a rank recovery-based spread estimator (RRSE) attempts to correct for noise by not assuming constant noise across the global register array M. Rather, the RRSE generates estimated register values assuming no noise is present within the virtual array $M_f$. In other words, the RRSE can correct the values of $M_f$ to remove the noise and then apply HLL on the corrected $M_f$ to estimate the cardinality of label f.

To generate the estimated register values, examples disclosed herein determine a rank distribution of an array of registers. As used herein, rank distribution refers to a table or array that indicates a count frequency of each value in the array of registers. For example, if a register array has values {0, 0, 1, 0, 1, 2}, then the rank distribution of the register array is {3, 2, 1} because there are three zeroes, two ones, and one two in the register array.

Disclosed examples determine a global rank distribution $C_m$ (e.g., global frequency count) corresponding to the global register array M and a virtual (or local) rank distribution $C_s$ (e.g., virtual frequency count) corresponding to a virtual (or local) register array $M_s$, where s is the size of the virtual register array $M_s$. The random noise present in $M_s$ should have the same probability distribution as the registers of M excluding the virtual registers $M_s$. As such, the rank distribution of the noise within $M_s$ can be determined based on $C_m$–$C_s$, and the noise can be removed from $M_s$.

An example of the determination of the rank distribution of the noise within $M_s$ is provided. For example, assume the global register array is M={4, 3, 2, 3, 1, 4, 5, 4, 3, 5} with size m=10, and the virtual register array is $M_s$={4, 2, 1} with size s=3 and corresponding to global registers of index {1, 3, 5}. When the count begins at zero, the global rank distribution is $C_m$={0, 1, 1, 3, 3, 2} and the local rank distribution is $C_s$ {0, 1, 1, 0, 1, 0} (e.g., M includes two fives). As mentioned, an estimation of the noise within $M_s$ is the distribution of the ranks within m–s registers of M, which exclude $M_s$. In other words, the estimated rank distribution of the noise within $M_s$ corresponds to $C_m$–$C_s$={0, 0, 0, 3, 2, 2}, which, in some examples, is used to denoise $M_s$. The virtual register array $M_s$ has the cumulative rank distribution $C_s$, which includes the noise. When $M_s$ is denoised, $C_s$ is transformed to a cumulative rank distribution $\hat{C}_f$ of label f. The noise-free cumulative rank distribution $\hat{C}_f$ is an estimate of the true cumulative rank distribution $C_f$ of label f. In other words, the rank distribution of the noise within $M_s$ can be used to estimate a recovered rank distribution $C_f[i]$ of label f, where i is an index value of the recovered array $C_f$. In some example, the recovered rank distribution of label f can be determined with an RRSE algorithm (example Equation 3).

Rank Recovery-based Spread Estimator of Label f, where:

$$\hat{C}_f[i] = \frac{C_s[i] - P_n[i]\sum_{j=0}^{i-1}\hat{C}_f[j]}{\sum_{j=0}^{i}P_n[j]}.$$ Equation 3

Noise in Global Register Array Excluding Local Register Array.

$$P_n[i] = \frac{C_m[i] - C_s[i]}{m - s}.$$ Equation 4

In some examples, the recovered (or estimated) array $\hat{C}_f$ can be used as inputs to the HLL algorithm for a more accurate cardinality estimate of label f, where $\hat{C}_f[i]$ is the number of registers that have maximum rank of value i after the noise has been removed. When the recovered array $\hat{C}_f$ is used in the HLL algorithm, (i) the number of global registers m is substituted with the number of virtual resisters s and (ii) the expression for Z is transformed to a weighted average of $\hat{C}_f[i]$, the number of registers that have maximum rank of value i, rather than a sum across each individual register respectively.

Examples disclosed herein use a simplified version (or derivation) of RRSE to allow computation of the RRSE with reduced time and memory allocation requirements. In some examples, the RRSE replaces an assumption of uniform noise across all registers with a probabilistic distribution of noise. More specifically, examples disclosed herein rely on a property in probabilistic theory relating a cumulative distribution function of two independent variables (e.g., X and Y). As used herein, a cumulative distribution function gives the probability that the real-valued random variable X will take a value less than or equal to x (i.e., $F_X(x)=P(X\leq x)$). The product of the cumulative distribution function of X (i.e., $F_X$) and the cumulative distribution function of Y (i.e., $F_Y$) yields the cumulative distribution function of the maximum value of X and Y. In other words, if Z is defined as Z=max(X, Y), then $F_Z=F_XF_Y$.

In examples disclosed herein, S represents the cumulative sum of rank distribution C. Furthermore, when the cumulative sum S is normalized by the total number of counts, S becomes the cumulative distribution function F. For example, if C={2, 2, 0, 1}, then S={2, 4, 4, 5}, and F={0.4, 0.8, 0.8, 1}. Disclosed examples can solve for the cumulative sum of the rank distribution of the local register array by first determining the cumulative distribution function for the values of label f. For example, let $F_s$ be the cumulative distribution function for the registers of $M_s$ for label f and assume the noise follows the same cumulative distribution function as the global register array excluding the virtual (or local) registers, $F_{m\setminus s}$, where $$F_{m\setminus s} = \frac{S_m - S_s}{m - s}.$$

The cumulative distribution function for the values of label f at the index i (Equation 5) can be determined using the probabilistic theory mentioned above.

Cumulative Distribution Function for Individual Values of Label f.

$$F_f[i] = \frac{F_s[i]}{F_{m\setminus s}[i]}$$ Equation 5

As shown above, Equation 5 can be used to determine a cumulative distribution function for an individual value of label f, $F_f[i]$. However, examples disclosed herein use a vectorized version of Equation 5 to determine an array of cumulative distribution function values of label f, $F_f$. Furthermore, disclosed examples normalize (or simplify) the terms of Equation 5 by the total counts of the corresponding register arrays (or rank distribution arrays)

$$\left(\text{e.g., } F_s[i] = \frac{S_s[i]}{s}, F_{m\setminus s}[i] = \frac{S_{m\setminus s}[i]}{m - s}, \text{etc.}\right).$$

As such, in some examples, the cumulative distribution function for label f (Equation 5) may be implemented in vectorized form as a single simplified formula (example Equation 6).

Cumulative Sum for Vectorized Values of Label f.

$$\hat{S}_f = (m-s)\left(\frac{S_s}{S_m - S_s}\right).$$  Equation 6

In example Equation 6 above, $\hat{S}_f$ is a cumulative sum of an estimated recovered (or denoised) rank distribution of label f, $S_s$ is the cumulative sum of the rank distribution of the local register array $M_s$, and $S_m$ is the cumulative sum of the rank distribution of the global register array M. From Equation 6, examples disclosed herein can directly compute the difference between individual elements of $\hat{S}_f$ to determine the estimated rank distribution of label f ($\hat{C}_f$). Determining $\hat{C}_f$ using Equation 6 is a simplified version of RRSE with reduced memory allocation, reduced computation, and increased output speeds.

Examples disclosed herein also allow processor circuitry to perform calculations to implement the simplified version of RRSE using example Equation 6 above. For example, instructions to implement such a vectorized version of RRSE include a Rank Distribution Recover Function as follows:

Function Rank Distribution Recover (Cs[ ], Cm[ ])

Initialize:

$\hat{C}_f[0...r] = 0$ $S_m = 0$ $S_s = 0$ $S_f = 0$ for $i = 0$ to $r$ do $S_m = S_m + C_m[i]$ $S_s = S_s + C_s[i]$ $\hat{C}_f[i] = S_s\left(\frac{m-s}{S_m - S_s}\right) - S_f$ $S_f = S_f + \hat{C}_f[i]$ return $\hat{C}_f[\,]$ In the example instructions above, $\hat{C}_f$ is an estimate of a recovered array of rank values that were initially lost due to the noise introduced by using vHLL, r is a maximum rank value associated with the size of the register used to determine the maximum rank of a label, $S_m$ is the cumulative sum of the rank distribution of the global register array M, $S_s$ is the cumulative sum of the rank distribution of the local register array $M_s$, $S_f$ is the cumulative sum of a rank distribution of label f, $C_m[i]$ is the value of the element in the ith position in the global array rank distribution, $C_s[i]$ is the value of the element in the ith position in the local array rank distribution, m is the size of the global register array M, and s is the size of a local register array $M_s$.

As mentioned above, the estimate of true cardinality of label f, $\hat{n}_f$, can be determined with the vHLL algorithm assuming a uniform noise across the registers. The RRSE algorithm can improve upon that assumption by replacing the constant noise with a probabilistic distribution of the noise. In examples disclosed herein, an implicit assumption is made that the cumulative distribution function $F_f$ for the registers of local register array $M_s$ for label f must be non-decreasing to be valid. Thus, for any ith position in the cumulative distribution function $F_f$ of local register array $M_s$ for label f, $F_f[i-1] \leq F_f[i]$. In some examples, the non-decreasing nature of the cumulative distribution function $F_f$ for label f may be verified prior to implementing the simplified version of RRSE (Equation 6) and/or prior to running the Rank Distribution Recover Function instructions described above.

In examples described herein, a virtual MaxSketch estimator may be used to allow for sharing of registers among a global register array M of size m. An example of an earlier, non-virtual version of a MaxSketch estimator was described by U.S. patent application Ser. No. 17/877,671, "Methods and Apparatus to Estimate Cardinality Through Ordered Statistics," filed on Jul. 29, 2022. MaxSketch is a method of estimating the cardinality of a large dataset.

In examples disclosed herein, for each label, a virtual register array $M_s$ of size s is obtained from M with the indices of $M_s$ being uniformly randomly sampled without replacement from indices of M. In some examples, the true number of unique entries (or cardinality) for label f is $n_f = sr$ (where r is the maximum rank value of a register (e.g., $r = 2^b - 1$, where b is the size of the register)). In such examples, $n_f$ random samples from a distribution X with a cumulative distribution function $F(x)$ are taken. In some examples, the $n_f = sr$ samples are partitioned into s mutually exclusive and equal sets, and the maximum within each set is taken, yielding s samples of $X_{(r)}$ when no register sharing is done. However, when register sharing is implemented, the noise can be removed using Equation 5 while noting that the determined value ($F_f[i]$) is replaced with the estimated maximum ($\hat{F}_f[i]$). An estimate of a normalized value of the register sharing noise can be determined using example Equation 7 below:

Vectorized Cumulative Distribution Function for Label f.

$$\hat{F}_f = \left(\frac{m-s}{s}\right)\left(\frac{S_s}{S_m - S_s}\right).$$  Equation 7

In example Equation 7 above, as the s samples of $X_{(r)}$ follow the cumulative distribution $F_{(r)}$, and as $\hat{F}_f$ is an estimate of the cumulative distribution $F_{(r)}$ with noise reduction, MaxSketch can be used on $\hat{F}_f$ to generate an estimate of r. In some examples, multiplying r by s returns the estimated cardinality of the label f (or $\hat{n}_f$). For consistent notation of the MaxSketch formula, let $\tilde{F}_{(r)} = \hat{F}_f$.

Virtual MaxSketch with Noise Reduction for Global Register Sharing.

$$\hat{n}_f = s\left(\frac{\tilde{\mathbb{E}}_{X_{(r)}}[-\log(\tilde{F}_{(r)})]}{\tilde{\mathbb{E}}_{X_{(r)}}[-\log(F)]}\right).$$  Equation 8

FIG. 1 illustrates an example system for virtually estimating cardinality of datasets with global register sharing. In some examples, the cardinality estimate includes a cardinality of a total dataset. In some examples, the cardinality estimate includes a cardinality of a portion of the dataset corresponding to a label, network flow, etc., such as label f mentioned above.

In the illustrated example of FIG. 1, a compute device 100 is present. The compute device 100 includes processor circuitry 102, a memory 104, a datastore 106, and a network interface controller 108. The example compute device 100 may be a laptop computer, a desktop computer, a workstation, a phone, a tablet, an embedded computer, or any other type of computing device. In some examples, the compute device 100 is a virtual machine running on a single physical computing device or a virtual machine running on portions of several computing devices across a distributed network or cloud infrastructure. In some examples, an interface 110 communicatively couples the processor circuitry 102, the memory 104, the datastore 106, and the network interface controller 108. The interface 110 may be any type of one or more interconnects that enable data movement between the processor circuitry 102, the memory 104, the datastore 106, and the network interface controller 108 within the compute device 100.

The example processor circuitry 102 may include portions or all of a general purpose central processing unit (CPU), a graphical processing unit (GPU), an application specific integrated circuit (ASIC), a field programmable gate array (FPGA), or any other type of processing logic capable of performing unique elements identification operations described below. The example memory 104 may store instructions to be executed by the processor circuitry 102 and/or one or more other circuitries within the compute device 100. In different examples, the memory 104 can be physical memory that could include volatile memory (e.g., dynamic random access memory (DRAM), static random access memory (SRAM), etc.) non-volatile memory, buffer memory within a processor, a cache memory, or any one or more other types of memory.

In the illustrated example, the datastore 106 may be a single datastore included in the compute device 100 or it may be a distributed datastore, which may be implemented by any number and/or type(s) of datastores. The datastore 106 may be implemented by volatile memory, non-volatile memory, or one or more mass storage devices such as hard disk drive(s) (HDD(s)), compact disk (CD) drive(s), digital versatile disk (DVD) drive(s), solid-state disk (SSD) drive(s), etc., or any other type of capable data storage technology. Furthermore, the data stored in the datastore 106 may be in any data format such as, for example, binary data, comma delimited data, tab delimited data, structured query language (SQL) structures, etc.

In the illustrated example, the network interface controller 108 may include one or more host controllers, one or more transceivers (e.g., transmission TX and receiving RX units), and/or one or more other circuitries capable of communicating across a network. The example network interface controller 108 includes one or more wireless network host controllers and/or transceivers to enable the compute device 100 to communicate (e.g., send/receive data packets) over a wireless network, such as network 112 (e.g., an IEEE 802.11-based wireless network, among others). For example, the network interface controller 108 may receive a data packet over a wireless network and provide the data from the data payload portion of the data packet to one or more circuitries within the compute device 100. In some examples, the network interface controller 108 includes one or more wired network host controllers and/or transceivers to enable the compute device 100 to communicate over a wired network, such as an Ethernet network or one or more other wired networks.

In the illustrated example of FIG. 1, the processor circuitry 102 includes a group (e.g., set) of registers 114. In some examples, the registers 114 are physical registers implemented in hardware within the processor circuitry 102. In some examples, the registers 114 are virtual registers implemented in software being executed by the processor circuitry 102. The example registers 114 may be of any length (e.g., 1024 bits, 4096 bits, etc.) and in any number (e.g., 512 registers, 1024 registers, 16384 registers, etc.).

As shown in FIG. 1, one or more reference datasets of reference media assets are accessible through the network 112 and/or elsewhere (e.g., reference dataset A 116 and reference dataset B 118). The example reference datasets A and B (116 and 118) include reference media assets data. In some examples, the reference media assets make up one or more of the reference datasets A and B (116 and 118). In some examples, additional data (e.g., additional monitoring information) is included in the one or more reference datasets A and B (116 and 118) beyond the reference media assets.

In some examples, reference datasets A and B (116 and 118) include aggregated reference media assets from diverse geographic regions captured in a wide range of time windows. Thus, in some examples, the reference datasets A and B (116 and 118) are very large and may be stored in large datastores accessible through the network 112. For example, one or more of the reference datasets A and B (116 and 118) may be too large to store in the compute device 100 memory 104 and/or local datastore 106. Additionally, in some examples, the reference datasets A and B (116 and 118) each may include a percentage of duplicate entries/elements/objects (e.g., reference dataset A 116 may have 20% duplicate entries). Also, in some examples, the reference datasets A and B (116 and 118) may include a percentage of overlapping entries/elements/objects across the two datasets (e.g., e.g., reference dataset A 116 and reference dataset B 118 may have 10% overlapping entries). As used herein, an "entry" in a dataset means a value that corresponds to a reference media asset.

According to the illustrated example in FIG. 1, the processor circuitry 102 includes a unique elements identification circuitry 120. The example unique elements identification circuitry 120 is described in greater detail with respect to the discussion of FIG. 2 below. In some examples, the unique elements identification circuitry 120 estimates a cardinality of a reference dataset (e.g., reference dataset A 116 and/or reference dataset B 118) by performing operations on a smaller sample dataset of reference media assets obtained from the reference dataset. As used herein, estimating a cardinality in a reference dataset means determining an estimated count of unique entries/elements/objects in the reference dataset.

In the illustrated example of FIG. 1, the unique elements identification circuitry 120 obtains one or more sample dataset(s) 122 (as shown in 122A and 122B, described below) from one or more of the reference datasets A and/or B (116 and/or 118) and causes the processor circuitry 102 to store the sample dataset(s) 122 in the memory 104.

Figure 2:
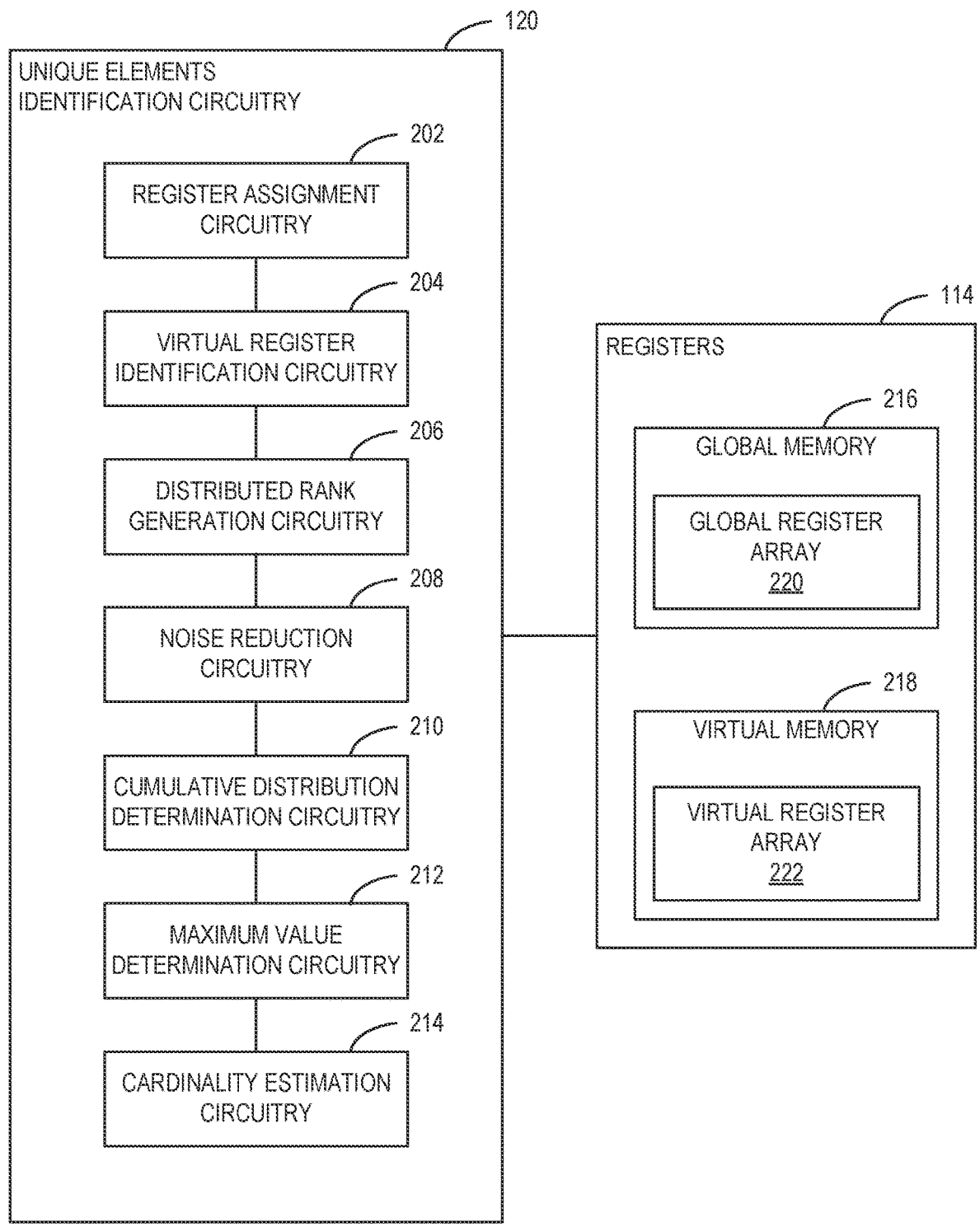
FIG. 2 is a block diagram of unique elements identification circuitry to estimate the cardinality of a dataset using shared memory across a global register array.

FIG. 2 is a block diagram of the unique elements identification circuitry 120 to estimate the cardinality of a dataset (e.g., sample datasets 122A, 122B, etc.) using shared memory across a global register array. The example unique elements identification circuitry 120 includes example register assignment circuitry 202, example virtual register identification circuitry 204, example distributed rank generation circuitry 206, example noise reduction circuitry 208, example cumulative distribution determination circuitry 210, example maximum value determination circuitry 212, and example cardinality estimation circuitry 214. Additionally, the example unique elements identification circuitry 120 may access example global memory 216 and example virtual (or local) memory 218 (e.g., for reading and/or writing of data stored and/or to be stored in such example memories). An example global register array 220 may be stored in global memory 216 and an example virtual (or local) register array 222 may be stored in virtual memory 218. In some examples, global memory 216 and virtual memory 218 are two separate physical memories. However, in other examples, global memory 216 and virtual memory 218 are two separate partitions/areas in a single physical memory.

The unique elements identification circuitry 120 of FIG. 2 may be instantiated (e.g., creating an instance of, bring into being for any length of time, materialize, implement, etc.) by processor circuitry such as a central processing unit executing instructions. Additionally or alternatively, the unique elements identification circuitry 120 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by one or more virtual machines and/or containers executing on the microprocessor.

The example unique elements identification circuitry 120 of FIG. 2 includes the example register assignment circuitry 202 to select a sample dataset to be used to determine the cardinality of a label (e.g., label f) in a reference dataset. Furthermore, the register assignment circuitry 202 assigns a group (e.g., m number of subsets) of data elements from the sample dataset to available registers in the global register array 220. In some examples, the register assignment circuitry 202 is instantiated by processor circuitry executing global register assignment instructions and/or configured to perform operations such as those represented by the flowcharts of FIGS. 3 and 4. Additionally or alternatively, the data elements stored in the global register array 220 (e.g., the sample dataset 122A) may be obtained from the memory 104 (e.g., the sample dataset(s) 122B), the reference dataset A 116, and/or the reference dataset B 118. In some examples, the sample dataset is selected based on the global register assignment circuitry instructions and/or user input.

In some examples, the register assignment circuitry 202 partitions the sample dataset into m subsets and assigns the subsets to the global register array 220 (or global register array M), which includes m registers. In some examples, the global register array 220 is shared among several entities that each have access to the global register array 220. As used herein, an entity may refer to processor circuitry, a computing device, a thread running on processor circuitry, and/or one or more other forms of logic capable of performing work on data stored in the global register array 220.

The example unique elements identification circuitry 120 of FIG. 2 includes the example virtual register identification circuitry 204 to identify which s number of arrays in the global register array 220 are to be included in the virtual register array 222. In some examples, the virtual register identification circuitry 204 is instantiated by processor circuitry executing virtual register identification instructions and/or configured to perform operations such as those represented by the flowchart of FIG. 4. In some examples, the virtual register identification circuitry 204 parses the data elements of the global register array 220 (M) and determines which registers include a label (e.g., a characteristic attribute), such as label f. The virtual register identification circuitry 204 partitions the data elements that include label f into the virtual register array 222, such as an $M_s$ array of virtual (e.g., local, or unshared) registers (e.g., the virtual memory 216).

The example label f may include a number of different values among the group of data elements. In some examples, there may be repeating values of the label among the group of data elements. For example, a group of four data elements that have a label f may have the following values of f [1, 3, 3, 4], where there are four data elements and four values corresponding to label f, but two of the values repeat (value 3). Thus the cardinality of the group of four data elements for unique values of the label f is three. Estimating the cardinality of the unique number of a label value among the group of data elements becomes more complex with larger datasets. In some examples, estimations of the cardinality of one or more label values in large datasets may include multiple entities performing the estimation work. Multiple entities performing such work on a shared global register array 220 may lead to noise in the cardinality estimation.

The example unique elements identification circuitry 120 of FIG. 2 includes the example distributed rank generation circuitry 206 to generate arrays of rank distributions for the global register array 220 and the virtual register array 222. For example, the distributed rank generation circuitry 206 determines a global rank distribution array $C_m$ for the global register array M of m registers. Further, the distributed rank generation circuitry 206 determines a virtual rank distribution array $C_s$ for the virtual register array $M_s$ of s registers. In some examples, the distributed rank generation circuitry 206 determines the frequency counts of the values in the global register array 220 and the virtual register array 222. The distributed rank generation circuitry 206 may then use the frequency counts to generate the global rank distribution array $C_m$ and the virtual rank distribution array $C_s$. In some examples, the distributed rank generation circuitry 206 is instantiated by processor circuitry executing distributed rank generation instructions and/or configured to perform operations such as those represented by the flowchart of FIG. 4.

The example unique elements identification circuitry 120 of FIG. 2 includes the example noise reduction circuitry 208 to generate an estimated array of recovered ranks $\hat{C}_f$ for the label f. The estimated array of recovered ranks includes a local rank distribution, such as frequency counts of data elements ranked in a distribution of the label value. In some examples, the noise reduction circuitry 208 obtains the global rank distribution array $C_m$ and the virtual rank distribution array $C_s$ from the distributed rank generation circuitry 206. The noise reduction circuitry 208 may then input the rank distributions $C_m$ and $C_s$ into the Rank Distribution Recover Function as described above. As such, in some examples, the noise reduction circuitry 208 executes the instructions included in the Rank Distribution Recover Function to generate the estimate array of recovered ranks for the label. The application of the example operations performed by the noise reduction circuitry 208 is a simplified version of the Rank-Recovery Spread Estimator (RRSE) described above, which yields improved performance of the compute device 100 (FIG. 1) based on a reduction of necessary computations and an increased speed of output. In some examples, the noise reduction circuitry 208 is instantiated by processor circuitry executing noise reduction instructions and/or configured to perform operations such as those represented by the flowchart of FIG. 4. In some examples, the noise reduction circuitry 204 determines that there is a non-decreasing cumulative distribution of the local rank distribution prior to generating the estimated array of recovered ranks.

In some examples, the noise reduction circuitry 208 calculates an estimate of the cumulative sum $\hat{S}_f$ of the rank distribution of a label in focus (e.g., the label f in which the cardinality of the values of the label is being estimated). For example, the noise reduction circuitry 204 may execute instructions to calculate Equation 6 for the label f. In other examples, the noise reduction circuitry 208 adds values of consecutive indices of the estimated array of recovered ranks $\hat{C}_f$ to determine an estimated array S of corresponding cumulative sums of the virtual rank distribution for label f.

The example unique elements identification circuitry 120 of FIG. 2 includes the example cumulative distribution determination circuitry 210 to determine an estimated cumulative distribution function for label f. In some examples, the cumulative distribution determination circuitry 210 is instantiated by processor circuitry executing cumulative distribution determination instructions and/or configured to perform operations such as those represented by the flowchart of FIG. 4. In some examples, the cumulative distribution determination circuitry 210 obtains the estimated recovered rank distribution array $\hat{C}_f$ from the noise reduction circuitry 208 and determines the estimated array $\hat{S}_f$ of corresponding cumulative sums for label f instead of the noise reduction circuitry 208. In other examples, the cumulative distribution determination circuitry 210 obtains estimated array $\hat{S}_f$ of corresponding cumulative sums for label f from the noise reduction circuitry 208. In some examples, the cumulative distribution determination circuitry 210 determines the number of registers that correspond to the label f in the virtual register array 222. For example, the cumulative distribution determination circuitry 210 can add the values of the estimated recovered rank distribution array $\hat{C}_f$ to determine a total count of the estimated recovered rank distribution array $\hat{C}_f$. Following the determination or procurement of the estimated cumulative sum S of the recovered rank distribution for label f, the cumulative distribution determination circuitry 210 normalizes the cumulative sum based on total count to determine the estimated cumulative distribution function for label f. In other words, the cumulative distribution determination circuitry 210 divides the cumulative sum by the total count to generate the cumulative distribution function for the label of focus.

The example unique elements identification circuitry 120 of FIG. 2 includes the example maximum value determination circuitry 212 to determine the maximum rank value of a label value (e.g., label f) associated with the data elements in the virtual register array 222, or $M_s$. In some examples, the maximum value identification circuitry 212 is instantiated by processor circuitry executing maximum value determination instructions and/or configured to perform operations such as those represented by the flowchart of FIG. 4. In some examples, the maximum value determination circuitry 212 As described above, the true number of unique entries for label f is $n_f$=sr (where r is the maximum rank value of a register (e.g., r=$2^b$−1, where b is the size of the register)). Thus, the example maximum value determination circuitry 212 takes $n_f$ random samples from a distribution X with a cumulative distribution function F(x). In some examples, the maximum value determination circuitry 212 partitions the $n_f$=sr samples into s mutually exclusive and equal sets and determines the maximum value within each set, yielding s samples of $X_{(r)}$. The maximum value determination circuitry 212 can then determine the maximum rank value of the maximum values within each set to determine the "r" term of Equation 8.

In some examples, the maximum value determination circuitry 212 executes the "r" term of Equation 8 as described above to determine the maximum rank value of the data elements within the registers in the virtual register array 222 associated with label f. As such, the maximum value determination circuitry 212 can input the cumulative distribution function for label f into the "r" term of Equation 8 to determine the maximum rank value r of the label f in the virtual register array 222. In some examples, the maximum value determination circuitry 212 determines an array of maximum rank values associated with the register array that includes the label of focus.

The example unique elements identification circuitry 120 of FIG. 2 includes the example cardinality estimation circuitry 214 to calculate an estimation of the cardinality of the label value of the data elements in the virtual register array 222. In some examples, the cardinality estimation circuitry 214 is instantiated by processor circuitry executing cardinality estimation instructions and/or configured to perform operations such as those represented by the flowcharts of FIGS. 3 and 4. The result of the example calculation performed by the cardinality estimation circuitry 208 is a virtual MaxSketch estimation of the cardinality of a dataset that compensates for the noise of sharing global registers. In some examples, the cardinality estimation circuitry 214 calculates the estimated cardinality $\hat{n}_f$ of the label value across the virtual register array 222 based on the product of the number of register arrays s in the virtual register array 222 and the maximum rank value r of the label value of the data elements across the virtual register array 222, as shown in Equation 8 above.

In some examples, the unique elements identification circuitry 120 of FIG. 2 includes the example cardinality estimation circuitry 214 to further calculate an estimation of the cardinality of the label value of the data elements in the dataset stored across the shared global register array 220 based on the cardinality estimation of the label value of the data elements across the virtual register array 222. For example, the cardinality estimation circuitry 214 can use a proportional relationship to calculate the estimation of the cardinality of the label value across the global register array 220. As such, the cardinality estimation circuitry 214 can determine a ratio of the number of registers s of the virtual register array 222 to the number of registers m of the global register array 220. The cardinality estimation circuitry 214 can then divide the estimated cardinality $\hat{n}_f$ of the label value across the local register array 222 by the ratio to determine the estimated cardinality $\hat{N}_f$ across the global register array 220. In other words, the cardinality estimation circuitry 214 may use the proportional relationship of $$\frac{\hat{n}_f}{\hat{N}_f} = \frac{s}{m}$$

to determine $\hat{N}_f$.

In some examples, the cardinality estimation circuitry 214 can perform a similar determination on a larger scale to calculate a cardinality estimation of the label value of the data elements across the reference dataset (e.g., reference dataset(s) 122A, 122B of FIG. 1) from which the register assignment circuitry 202 initially obtained the sample dataset. In such examples, the cardinality estimation circuitry 214 determines a ratio of the number of data elements in the shared global memory 216 to the number of data elements in the reference dataset and divides the estimated cardinality $\hat{N}_f$ by the ratio. In other examples, the cardinality estimation circuitry 214 can use another probabilistic model (e.g., non-parametric models, etc.) to determine the estimated cardinality of the label across the reference dataset based on the estimated cardinality of the label across the global register array 220.

In some examples, the compute device 100 includes means for assigning a group of data elements to available registers in a global register array. For example, the means for assigning may be implemented by register assignment circuitry 202. In some examples, the register assignment circuitry 202 may be instantiated by processor circuitry such as the example processor circuitry 512 of FIG. 5. For instance, the register assignment circuitry 202 may be instantiated by the example microprocessor 600 of FIG. 6 executing machine executable instructions such as those implemented by at least block 402 of FIG. 4. In some examples, the register assignment circuitry 202 may be instantiated by hardware logic circuitry, which may be implemented by an ASIC, XPU, or the FPGA circuitry 700 of FIG. 7 structured to perform operations corresponding to the machine readable instructions. Additionally or alternatively, the register assignment circuitry 202 may be instantiated by any other combination of hardware, software, and/or firmware. For example, the register assignment circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for assigning includes means for selecting a sample dataset to be used to determine the cardinality of a label (e.g., label f) in a reference dataset. For example, the means for selecting may be implemented by register assignment circuitry 202. In some examples, the register assignment circuitry 202 may be instantiated by processor circuitry such as the example processor circuitry 512 of FIG. 5. For instance, the register assignment circuitry 202 may be instantiated by the example microprocessor 600 of FIG. 6 executing machine executable instructions such as those implemented by at least block 302 of FIG. 3. In some examples, the register assignment circuitry 202 may be instantiated by hardware logic circuitry, which may be implemented by an ASIC, XPU, or the FPGA circuitry 700 of FIG. 7 structured to perform operations corresponding to the machine readable instructions. Additionally or alternatively, the register assignment circuitry 202 may be instantiated by any other combination of hardware, software, and/or firmware. For example, the register assignment circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the compute device 100 includes means for identifying a virtual array of s registers from the global register array 220 that include the label of focus (e.g., label f). For example, the means for identifying may be implemented by virtual register identification circuitry 204. In some examples, the virtual register identification circuitry 204 may be instantiated by processor circuitry such as the example processor circuitry 512 of FIG. 5. For instance, the virtual register identification circuitry 204 may be instantiated by the example microprocessor 600 of FIG. 6 executing machine executable instructions such as those implemented by at least blocks 404 of FIG. 4. In some examples, the virtual register identification circuitry 204 may be instantiated by hardware logic circuitry, which may be implemented by an ASIC, XPU, or the FPGA circuitry 700 of FIG. 7 structured to perform operations corresponding to the machine readable instructions. Additionally or alternatively, the virtual register identification circuitry 204 may be instantiated by any other combination of hardware, software, and/or firmware. For example, the virtual register identification circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the compute device 100 includes means for generating arrays of rank distributions for the global register array 220 and the virtual register array 222. For example, the means for generating global and virtual rank distribution arrays may be implemented by distributed rank generation circuitry 206. In some examples, the distributed rank generation circuitry 206 may be instantiated by processor circuitry such as the example processor circuitry 512 of FIG. 5. For instance, the distributed rank generation circuitry 206 may be instantiated by the example microprocessor 600 of FIG. 6 executing machine executable instructions such as those implemented by at least blocks 406 and 408 of FIG. 4. In some examples, the distributed rank generation circuitry 206 may be instantiated by hardware logic circuitry, which may be implemented by an ASIC, XPU, or the FPGA circuitry 700 of FIG. 7 structured to perform operations corresponding to the machine readable instructions. Additionally or alternatively, the distributed rank generation circuitry 206 may be instantiated by any other combination of hardware, software, and/or firmware. For example, the distributed rank generation circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the compute device 100 includes means for generating an estimated array of recovered ranks for the label of focus (e.g., label f). For example, the means for generating the estimated array of recovered ranks may be implemented by noise reduction circuitry 208. In some examples, the noise reduction circuitry 208 may be instantiated by processor circuitry such as the example processor circuitry 512 of FIG. 5. For instance, the noise reduction circuitry 208 may be instantiated by the example micropro- cessor 600 of FIG. 6 executing machine executable instructions such as those implemented by at least blocks 410 of FIG. 4. In some examples, the noise reduction circuitry 208 may be instantiated by hardware logic circuitry, which may be implemented by an ASIC, XPU, or the FPGA circuitry 700 of FIG. 7 structured to perform operations corresponding to the machine readable instructions. Additionally or alternatively, the noise reduction circuitry 208 may be instantiated by any other combination of hardware, software, and/or firmware. For example, the noise reduction circuitry 208 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the compute device 100 includes means for determining an estimated cumulative distribution function for the label of focus. For example, the means for determining the estimated cumulative distribution function may be implemented by cumulative distribution determination circuitry 210. In some examples, the cumulative distribution determination circuitry 210 may be instantiated by processor circuitry such as the example processor circuitry 512 of FIG. 5. For instance, the cumulative distribution determination circuitry 210 may be instantiated by the example microprocessor 600 of FIG. 6 executing machine executable instructions such as those implemented by at least blocks 412 of FIG. 4. In some examples, the cumulative distribution determination circuitry 210 may be instantiated by hardware logic circuitry, which may be implemented by an ASIC, XPU, or the FPGA circuitry 700 of FIG. 7 structured to perform operations corresponding to the machine readable instructions. Additionally or alternatively, the cumulative distribution determination circuitry 210 may be instantiated by any other combination of hardware, software, and/or firmware. For example, the cumulative distribution determination circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the compute device 100 includes means for determining a maximum rank value of label value associated with the data elements in the virtual register array 222. For example, the means for determining the maximum rank value may be implemented by maximum value determination circuitry 212. In some examples, the maximum value determination circuitry 212 may be instantiated by processor circuitry such as the example processor circuitry 512 of FIG. 5. For instance, the maximum value determination circuitry 212 may be instantiated by the example microprocessor 600 of FIG. 6 executing machine executable instructions such as those implemented by at least blocks 414 of FIG. 4. In some examples, the maximum value determination circuitry 212 may be instantiated by hardware logic circuitry, which may be implemented by an ASIC, XPU, or the FPGA circuitry 700 of FIG. 7 structured to perform operations corresponding to the machine readable instructions. Additionally or alternatively, the maximum value determination circuitry 212 may be instantiated by any other combination of hardware, software, and/or firmware. For example, the maximum value determination circuitry 212 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the compute device 100 includes means for calculating an estimation of the cardinality of a label value of data elements stored across the virtual register array 222, the global register array 220, and/or the reference dataset. For example, the means for calculating an estimation of the cardinality of a label may be implemented by cardinality estimation circuitry 214. In some examples, the c cardinality estimation circuitry 214 may be instantiated by processor circuitry such as the example processor circuitry 512 of FIG. 5. For instance, the cardinality estimation circuitry 214 may be instantiated by the example microprocessor 600 of FIG. 6 executing machine executable instructions such as those implemented by at least blocks 416 of FIG. 4. In some examples, the cardinality estimation circuitry 214 may be instantiated by hardware logic circuitry, which may be implemented by an ASIC, XPU, or the FPGA circuitry 700 of FIG. 7 structured to perform operations corresponding to the machine readable instructions. Additionally or alternatively, the cardinality estimation circuitry 214 may be instantiated by any other combination of hardware, software, and/or firmware. For example, the cardinality estimation circuitry 214 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the unique elements identification circuitry 120 is illustrated in FIG. 2, one or more of the elements, processes, and/or devices illustrated in FIG. 2 may be combined, divided, re-arranged, omitted, eliminated, and/or implemented in any other way. Further, the example register assignment circuitry 202, the example virtual register identification circuitry 204, the example distributed rank generation circuitry 206, the example noise reduction circuitry 208, the example cumulative distribution determination circuitry 210, the example maximum value identification circuitry 212, the example cardinality estimation circuitry 214, and/or, more generally, the example unique elements identification circuitry 120 of FIG. 1, may be implemented by hardware alone or by hardware in combination with software and/or firmware. Thus, for example, any of the example register assignment circuitry 202, the example virtual register identification circuitry 204, the example distributed rank generation circuitry 206, the example noise reduction circuitry 208, the example cumulative distribution determination circuitry 210, the example maximum value identification circuitry 212, the example cardinality estimation circuitry 214, and/or, more generally, the example unique elements identification circuitry 120, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example unique elements identification circuitry 120 of FIG. 2 may include one or more elements, processes, and/or devices in addition to, or instead of, those illustrated in FIG. 2, and/or may include more than one of any or all of the illustrated elements, processes, and devices.

Figure 3:
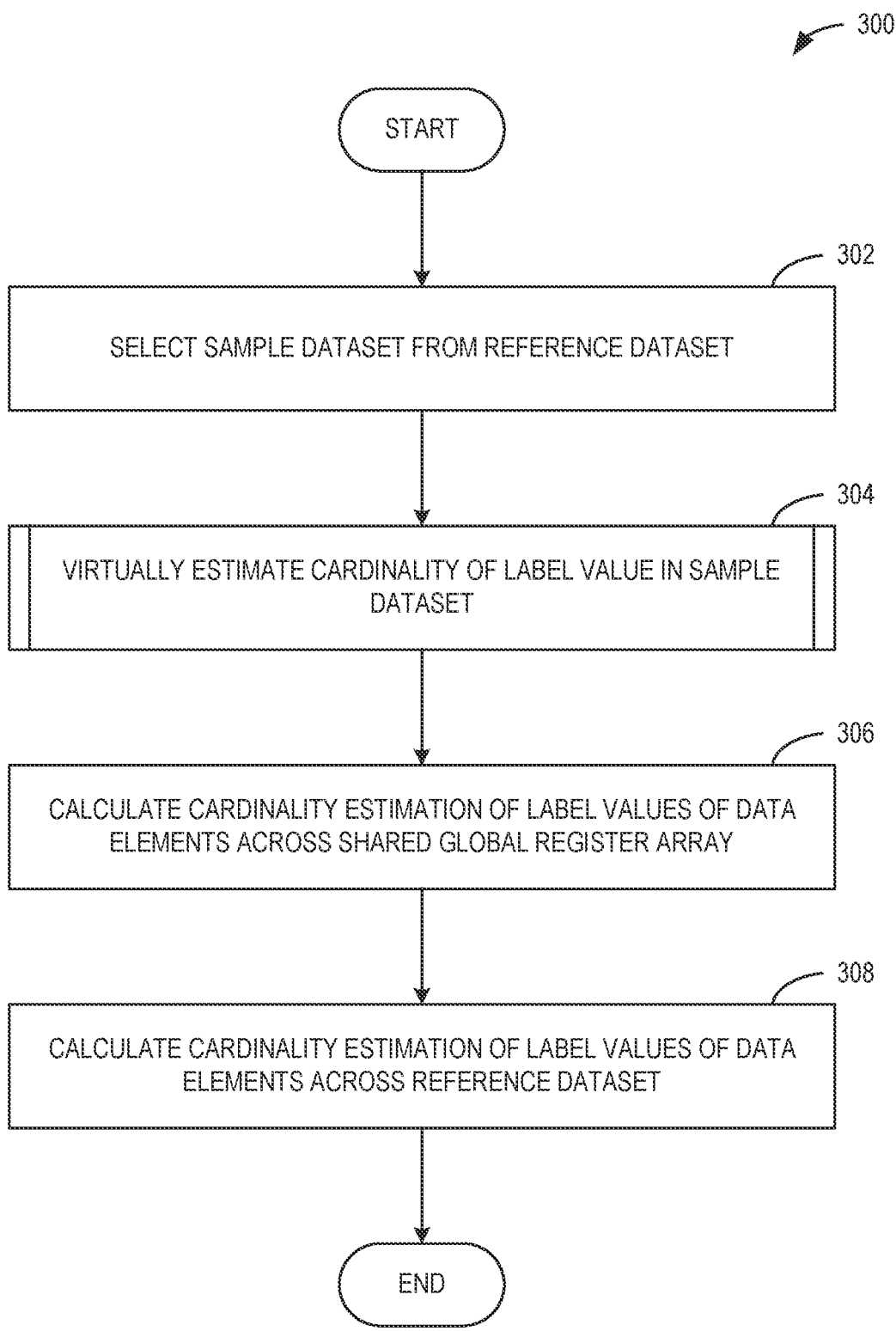
FIG. 3 is a flowchart representative of example machine readable instructions and/or example operations that may be executed by example processor circuitry to implement the unique elements identification circuitry of FIG. 2 to estimate the cardinality of a label value of a dataset across a shared global register array.
Figure 4:
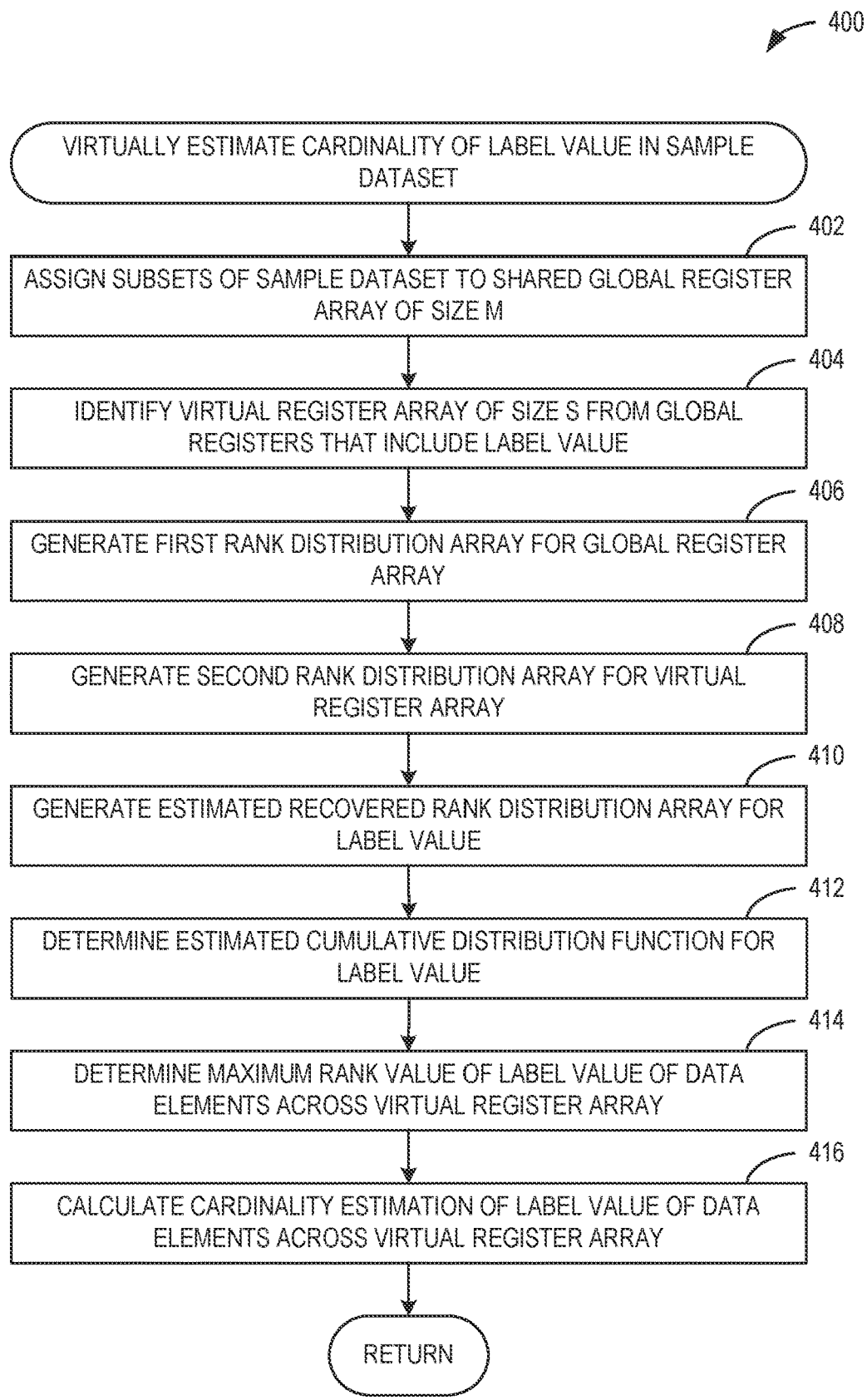
FIG. 4 is a flowchart representative of example machine readable instructions and/or example operations that may be executed by example processor circuitry to implement the unique elements identification circuitry of FIG. 2 to estimate the cardinality of a label value of a dataset across a virtual register array.

Flowcharts representative of example hardware logic circuitry, machine readable instructions, hardware implemented state machines, and/or any combination thereof for implementing the compute device 100 of FIG. 1 and/or the unique elements identification circuitry 120 of FIG. 2 are shown in FIGS. 3 and 4. The machine readable instructions may be one or more executable programs or portion(s) of an executable program for execution by processor circuitry, such as the processor circuitry 512 shown in the example processor platform 500 discussed below in connection with FIG. 5 and/or the example processor circuitry discussed below in connection with FIGS. 6 and/or 7. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 3 and 4, many other methods of implementing the example compute device 100 and/or the example unique elements identification circuitry 120 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 3 and 4 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 3 is a flowchart representative of example machine readable instructions and/or example operations 300 that may be executed and/or instantiated by processor circuitry to virtually estimate cardinality of a dataset stored in global registers and/or a reference dataset. The machine readable instructions and/or the operations 300 of FIG. 3 begin at block 302, at which the compute device 100 (e.g., the register assignment circuitry 202) selects a sample dataset to be used in the cardinality estimation. For example, the register assignment circuitry 202 selects the sample dataset from a reference dataset (e.g., reference dataset(s) 122A and/or 122B of FIG. 1) based on the example machine readable instructions 300 and/or user input. In some examples, the sample dataset is to be used to determine the estimated cardinality of a label value (e.g., label f) in the reference dataset.

At block 304, the compute device 100 (e.g., the cardinality estimation circuitry 214) virtually estimates the cardinality for the label value. For example, the cardinality estimation circuitry 214 determines the cardinality estimation for the label value of the data elements of the virtual register array 222. Further details on the operations of block 304 are described below in connection with FIG. 4.

At block 306, the compute device 100 (e.g., the cardinality estimation circuitry 214) calculates a cardinality estimation of the label value of data elements across the global register array 220. For example, the cardinality estimation circuitry 214 uses the virtual cardinality estimation from block 304 to determine the global cardinality estimation of the label value based on the virtual cardinality estimation $\hat{n}_f$, a first number of registers (e.g., m) in the global register array 220, and a second number of registers (e.g., s) in the virtual register array 222. In some examples, the cardinality estimation circuitry 214 determines the global cardinality estimation based on a proportional relationship between a first ratio of the virtual cardinality estimation f to the global cardinality estimation $\hat{N}_f$ equal to a second ratio of the number of virtual registers s to the number of global registers m.

At block 306, the compute device 100 (e.g., the cardinality estimation circuitry 214) calculates a cardinality estimation of a label value of data elements across the reference dataset. For example, the cardinality estimation circuitry 214 can perform a similar operation as that which is performed at block 304. However, rather than calculating the cardinality estimation based on the proportional relationship between the ratio of cardinality estimations and the ratio of register numbers, the cardinality estimation circuitry 214 can use the ratio of the number of data elements in the global register array 220 to the number of data elements in the reference dataset in the proportional relationship. In some examples, the cardinality estimation circuitry 214 uses a probabilistic model to extrapolate the global cardinality estimation (block 306) and/or the virtual cardinality estimation (block 304) to estimate the cardinality of the label value of the reference dataset.

FIG. 4 is a flowchart representative of example machine readable instructions and/or example operations 400 that may be executed and/or instantiated by processor circuitry to virtually estimate the cardinality of label value of a virtual register array 222 (FIG. 2). The machine readable instructions and/or the operations 400 of FIG. 4 begin at block 402, at which the compute device 100 (e.g., the register assignment circuitry 202) assigns a group of data elements to available registers in a global register array 220 (FIG. 2). For example, the register assignment circuitry 202 assigns subsets of the sample dataset to the shared global register array 220 of size m. In some examples, the register assignment circuitry 202 parses the data elements of the selected sample dataset and determines how the data elements should be stored in respected global registers of the global register array 220 in the shared global memory 216 based on the example machine readable instructions 400 and/or user input.

At block 404, the compute device 100 (e.g., the virtual register identification circuitry 204) identifies s number of global registers that include the label value (e.g., label f). For example, the virtual register identification circuitry 204 identifies the virtual register array 222 of size s from global registers (e.g., the global register array 220) that include the label value. In some examples, the virtual register identification circuitry 204 parses the m number of global registers of the global register array 220 and determines whether the registers include the label value. In some examples, the virtual register identification circuitry 204 stores the corresponding registers in the virtual memory 218 as part of the virtual register array 222, which may or may not be physically separated from the global memory 216.

At block 406, the compute device 100 (e.g., the distributed rank generation circuitry 206) generates a first rank distribution array $C_m$ (e.g., a global rank distribution array) for the global register array 220. Similarly, at block 408, the compute device 100 (e.g., the distributed rank generation circuitry 206) generates a second rank distribution array $C_s$ (e.g., a virtual rank distribution array) for the virtual register array 222. For example, the distributed rank generation circuitry 206 determines a first frequency count of the values in the global register array 220 and a second frequency count of the values in the virtual register array 222. The distributed rank generation circuitry 206 can output the first and second frequency counts in the global rank distribution array and the virtual rank distribution array, respectively.

At block 410, the compute device 100 (e.g., the noise reduction circuitry 208) generates an estimated recovered rank distribution array $\hat{C}_f$ for the label value of the data elements across the virtual register array 222. For example, the noise reduction circuitry 208 inputs the global rank distribution array (block 406) and the virtual rank distribution array (block 408) to the Rank Recovery Distribution Function mentioned above and executes the associated instructions to output the array of recovered rank distributions for the label f. In some examples, the recovered rank distribution array is the virtual register array 222 that represents the frequency counts of data elements ranked in a distribution of the label value with an estimation of the noise removed.

At block 412, the compute device 100 (e.g., the cumulative distribution determination circuitry 210) determines an estimated cumulative distribution function $\hat{F}_f$ for the label value of the data elements across the virtual register array 222. For example, the cumulative distribution determination circuitry 210 determines a cumulative sum S based on the estimated recovered rank distribution array $\hat{C}_f$ (block 410). The cumulative distribution determination circuitry 210 then divides the cumulative sum by the number of registers (s) in the virtual register array 222.

At block 414, the compute device 100 (e.g., the maximum value determination circuitry 212) determines a maximum rank value r of the label value of the data elements across the virtual register array 222. For example, the maximum value determination circuitry 212 inputs the estimated cumulative distribution function $\hat{F}_f$ into the second term of Equation 8 mentioned above to determine (or output) the maximum rank value r.

At block 416, the compute device 100 (e.g., the cardinality estimation circuitry 214) calculates a cardinality estimation of the label value of the data elements across the virtual register array 222. For example, the cardinality estimation circuitry 214 determines the estimation of the cardinality of the label value based on the product of the number of registers (s) in the virtual register array 222 and the maximum rank value of the label value in the virtual memory 218.

After block 416 completes, the example machine readable instructions and/or the operations 400 of FIG. 4 return to block 306 of FIG. 3.

Figure 5:
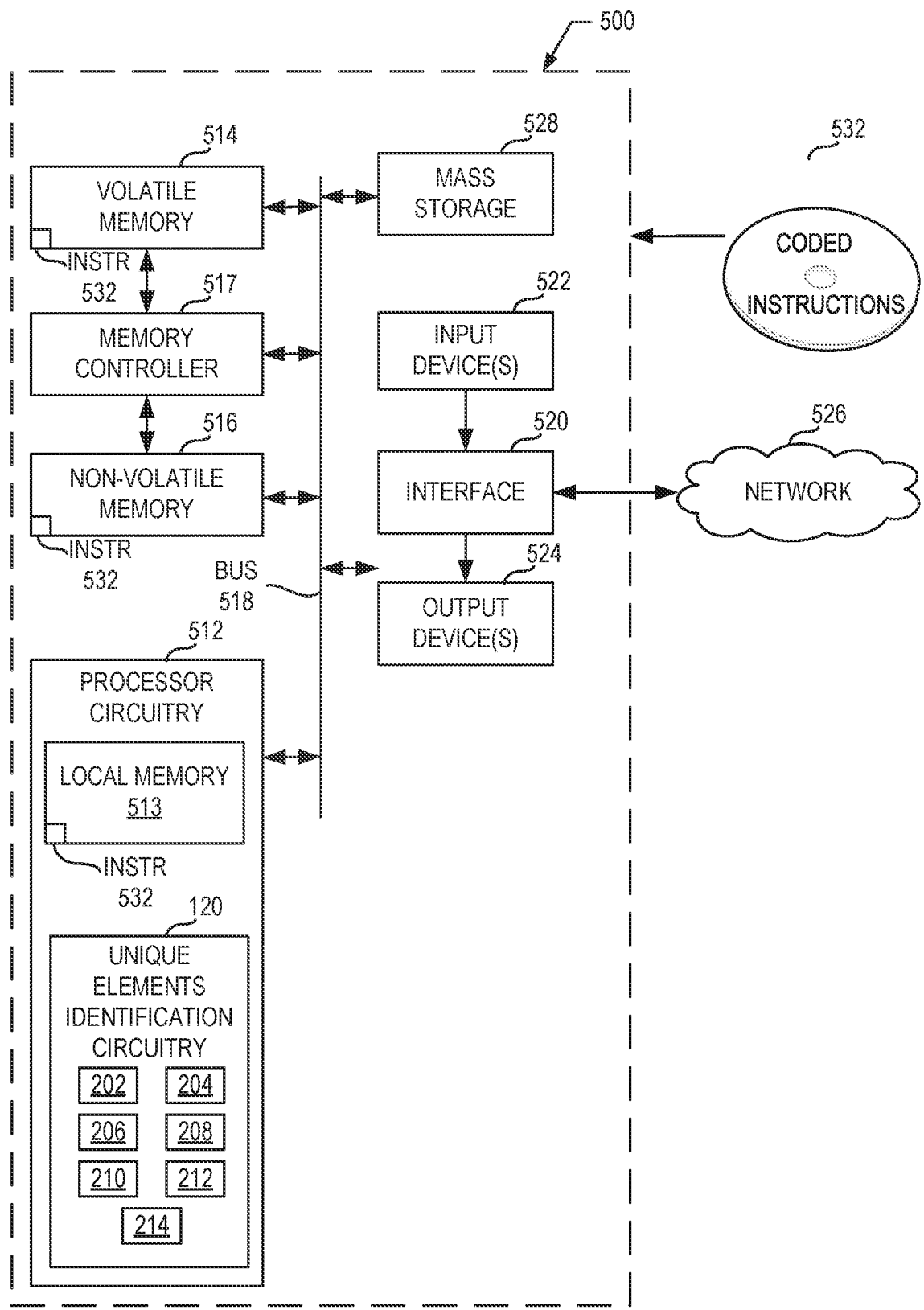
FIG. 5 is a block diagram of an example processing platform including processor circuitry structured to execute the example machine readable instructions and/or the example operations of FIGS. 3 and 4 to implement the unique elements identification circuitry of FIG. 2.

FIG. 5 is a block diagram of an example processor platform 500 structured to execute and/or instantiate the machine readable instructions and/or the operations of FIGS. 3 and 4 to implement the compute device 100 of FIG. 1 and/or the unique elements identification circuitry 120. The processor platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 500 of the illustrated example includes processor circuitry 512. The processor circuitry 512 of the illustrated example is hardware. For example, the processor circuitry 512 can be implemented by one or more integrated circuits, logic circuits, FPGAs, microprocessors, CPUs, GPUs, DSPs, and/or microcontrollers from any desired family or manufacturer. The processor circuitry 512 may be implemented by one or more semiconductor based (e.g., silicon based) devices. In this example, the processor circuitry 512 implements the example register assignment circuitry 202, the example virtual register identification circuitry 204, the example distributed rank generation circuitry 206, the example noise reduction circuitry 208, the example cumulative distribution determination circuitry 210, the example maximum value identification circuitry 212, the example cardinality estimation circuitry 214, and/or, more generally, the example unique elements identification circuitry 120.

The processor circuitry 512 of the illustrated example includes a local memory 513 (e.g., a cache, registers, etc.). The processor circuitry 512 of the illustrated example is in communication with a main memory including a volatile memory 514 and a non-volatile memory 516 by a bus 518. The volatile memory 514 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 516 may be implemented by flash memory and/or any other desired type of memory device. Access to the main memory 514, 516 of the illustrated example is controlled by a memory controller 517.

The processor platform 500 of the illustrated example also includes interface circuitry 520. The interface circuitry 520 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 522 are connected to the interface circuitry 520. The input device(s) 522 permit(s) a user to enter data and/or commands into the processor circuitry 512. The input device(s) 522 can be implemented by, for example, an audio sensor, a microphone, a camera (still or video), a keyboard, a button, a mouse, a touchscreen, a track-pad, a trackball, an isopoint device, and/or a voice recognition system.

One or more output devices 524 are also connected to the interface circuitry 520 of the illustrated example. The output device(s) 524 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 520 of the illustrated example, thus, typically includes a graphics driver card, a graphics driver chip, and/or graphics processor circuitry such as a GPU.

The interface circuitry 520 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 526. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 500 of the illustrated example also includes one or more mass storage devices 528 to store software and/or data. Examples of such mass storage devices 528 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 532, which may be implemented by the machine readable instructions of FIGS. 3 and 4, may be stored in the mass storage device 528, in the volatile memory 514, in the non-volatile memory 516, and/or on a removable non-transitory computer readable storage medium such as a CD or DVD.

Figure 6:
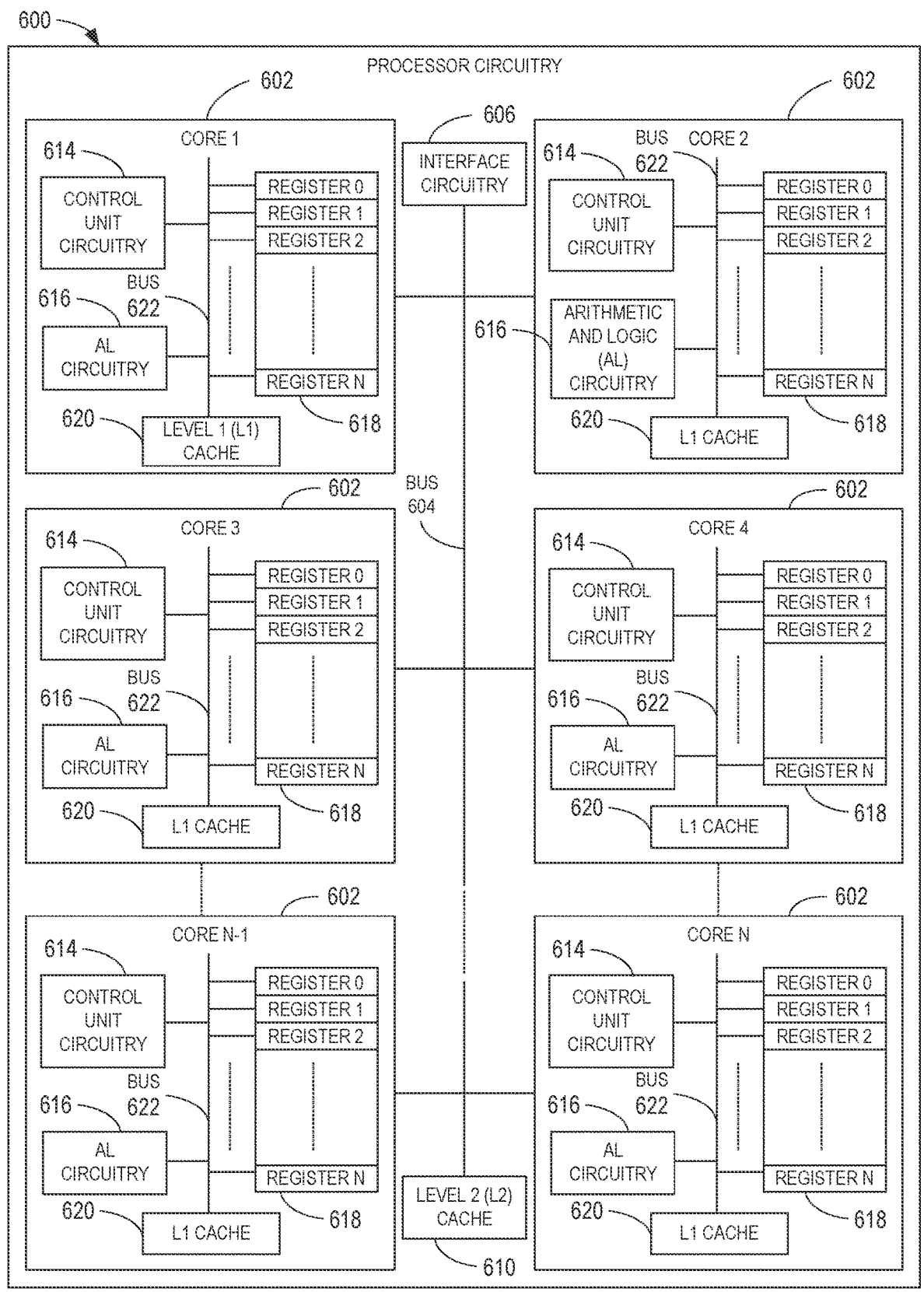
FIG. 6 is a block diagram of an example implementation of the processor circuitry of FIG. 5.

FIG. 6 is a block diagram of an example implementation of the processor circuitry 512 of FIG. 5. In this example, the processor circuitry 512 of FIG. 5 is implemented by a microprocessor 600. For example, the microprocessor 600 may be a general purpose microprocessor (e.g., general purpose microprocessor circuitry). The microprocessor 600 executes some or all of the machine readable instructions of the flowcharts of FIGS. 3 and 4 to effectively instantiate the unique elements identification circuitry 120 of FIGS. 1 and 2 as logic circuits to perform the operations corresponding to those machine readable instructions. In some such examples, the circuitry of FIG. 1 is instantiated by the hardware circuits of the microprocessor 600 in combination with the instructions. For example, the microprocessor 600 may be implemented by multi-core hardware circuitry such as a CPU, a DSP, a GPU, an XPU, etc. Although it may include any number of example cores 602 (e.g., 1 core), the microprocessor 600 of this example is a multi-core semiconductor device including N cores. The cores 602 of the microprocessor 600 may operate independently or may cooperate to execute machine readable instructions. For example, machine code corresponding to a firmware program, an embedded software program, or a software program may be executed by one of the cores 602 or may be executed by multiple ones of the cores 602 at the same or different times. In some examples, the machine code corresponding to the firmware program, the embedded software program, or the software program is split into threads and executed in parallel by two or more of the cores 602. The software program may correspond to a portion or all of the machine readable instructions and/or operations represented by the flowcharts of FIGS. 3 and 4.

The cores 602 may communicate by a first example bus 604. In some examples, the first bus 604 may be implemented by a communication bus to effectuate communication associated with one(s) of the cores 602. For example, the first bus 604 may be implemented by at least one of an Inter-Integrated Circuit (I2C) bus, a Serial Peripheral Interface (SPI) bus, a PCI bus, or a PCIe bus. Additionally or alternatively, the first bus 604 may be implemented by any other type of computing or electrical bus. The cores 602 may obtain data, instructions, and/or signals from one or more external devices by example interface circuitry 606. The cores 602 may output data, instructions, and/or signals to the one or more external devices by the interface circuitry 606. Although the cores 602 of this example include example local memory 620 (e.g., Level 1 (L1) cache that may be split into an L1 data cache and an L1 instruction cache), the microprocessor 600 also includes example shared memory 610 that may be shared by the cores (e.g., Level 2 (L2 cache)) for high-speed access to data and/or instructions. Data and/or instructions may be transferred (e.g., shared) by writing to and/or reading from the shared memory 610. The local memory 620 of each of the cores 602 and the shared memory 610 may be part of a hierarchy of storage devices including multiple levels of cache memory and the main memory (e.g., the main memory 514, 516 of FIG. 5). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 602 may be referred to as a CPU, DSP, GPU, etc., or any other type of hardware circuitry. Each core 602 includes control unit circuitry 614, arithmetic and logic (AL) circuitry (sometimes referred to as an ALU) 616, a plurality of registers 618, the local memory 620, and a second example bus 622. Other structures may be present. For example, each core 602 may include vector unit circuitry, single instruction multiple data (SIMD) unit circuitry, load/store unit (LSU) circuitry, branch/jump unit circuitry, floating-point unit (FPU) circuitry, etc. The control unit circuitry 614 includes semiconductor-based circuits structured to control (e.g., coordinate) data movement within the corresponding core 602. The AL circuitry 616 includes semiconductor-based circuits structured to perform one or more mathematic and/or logic operations on the data within the corresponding core 602. The AL circuitry 616 of some examples performs integer based operations. In other examples, the AL circuitry 616 also performs floating point operations. In yet other examples, the AL circuitry 616 may include first AL circuitry that performs integer based operations and second AL circuitry that performs floating point operations. In some examples, the AL circuitry 616 may be referred to as an Arithmetic Logic Unit (ALU). The registers 618 are semiconductor-based structures to store data and/or instructions such as results of one or more of the operations performed by the AL circuitry 616 of the corresponding core 602. For example, the registers 618 may include vector register(s), SIMD register(s), general purpose register(s), flag register(s), segment register(s), machine specific register(s), instruction pointer register(s), control register(s), debug register(s), memory management register(s), machine check register(s), etc. The registers 618 may be arranged in a bank as shown in FIG. 6. Alternatively, the registers 618 may be organized in any other arrangement, format, or structure including distributed throughout the core 602 to shorten access time. The second bus 622 may be implemented by at least one of an I2C bus, a SPI bus, a PCI bus, or a PCIe bus Each core 602 and/or, more generally, the microprocessor 600 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 600 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or programmable device can also be an accelerator. Accelerators may be on-board the processor circuitry, in the same chip package as the processor circuitry and/or in one or more separate packages from the processor circuitry.

Figure 7:
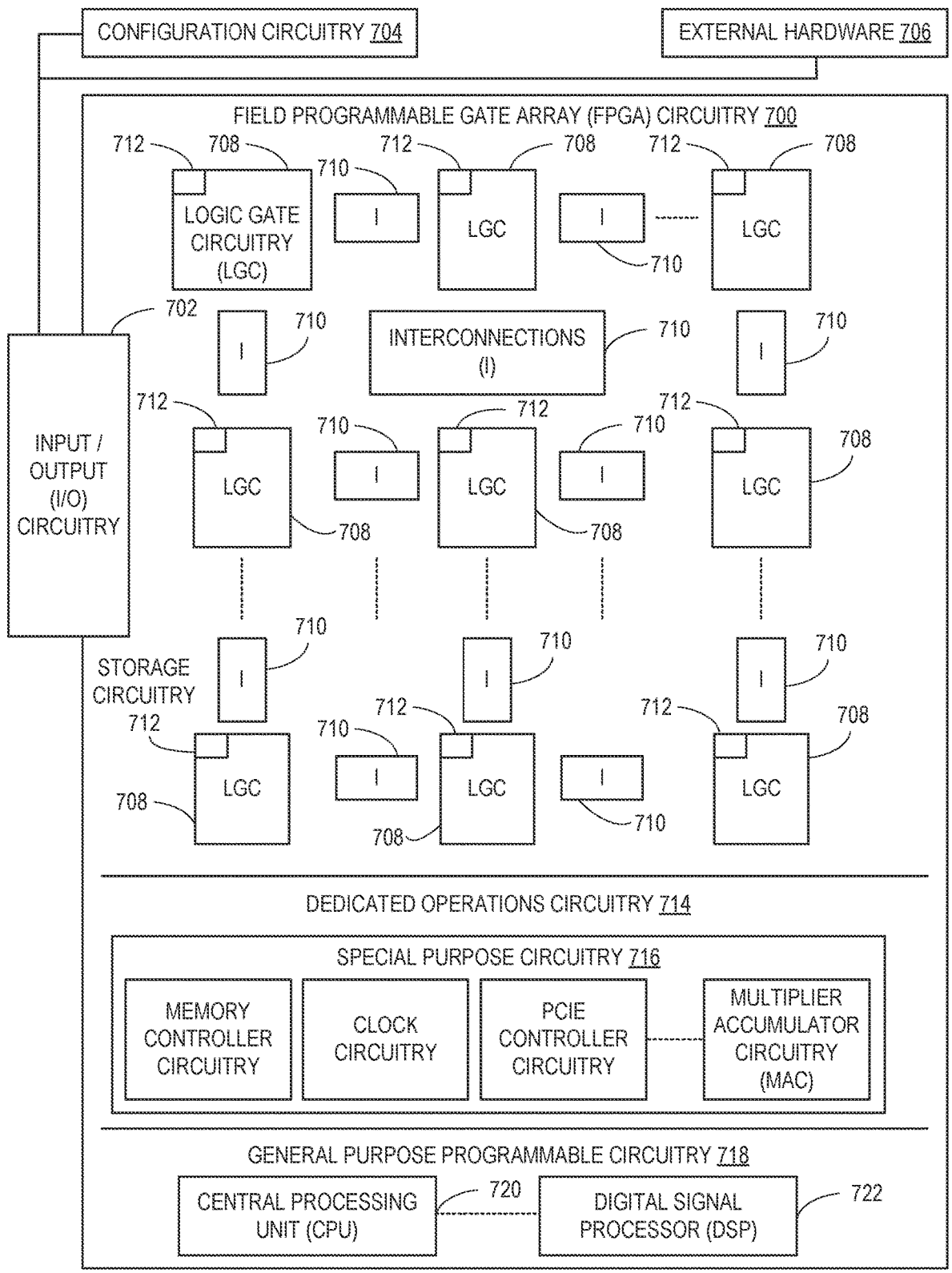
FIG. 7 is a block diagram of another example implementation of the processor circuitry of FIG. 5.

FIG. 7 is a block diagram of another example implementation of the processor circuitry 512 of FIG. 5. In this example, the processor circuitry 512 is implemented by FPGA circuitry 700. For example, the FPGA circuitry 700 may be implemented by an FPGA. The FPGA circuitry 700 can be used, for example, to perform operations that could otherwise be performed by the example microprocessor 600 of FIG. 6 executing corresponding machine readable instructions. However, once configured, the FPGA circuitry 700 instantiates the machine readable instructions in hardware and, thus, can often execute the operations faster than they could be performed by a general purpose microprocessor executing the corresponding software.

More specifically, in contrast to the microprocessor 600 of FIG. 6 described above (which is a general purpose device that may be programmed to execute some or all of the machine readable instructions represented by the flowcharts of FIGS. 3 and 4 but whose interconnections and logic circuitry are fixed once fabricated), the FPGA circuitry 700 of the example of FIG. 7 includes interconnections and logic circuitry that may be configured and/or interconnected in different ways after fabrication to instantiate, for example, some or all of the machine readable instructions represented by the flowcharts of FIGS. 3 and 4. In particular, the FPGA circuitry 700 may be thought of as an array of logic gates, interconnections, and switches. The switches can be programmed to change how the logic gates are interconnected by the interconnections, effectively forming one or more dedicated logic circuits (unless and until the FPGA circuitry 700 is reprogrammed). The configured logic circuits enable the logic gates to cooperate in different ways to perform different operations on data received by input circuitry. Those operations may correspond to some or all of the software represented by the flowcharts of FIGS. 3 and 4. As such, the FPGA circuitry 700 may be structured to effectively instantiate some or all of the machine readable instructions of the flowcharts of FIGS. 3 and 4 as dedicated logic circuits to perform the operations corresponding to those software instructions in a dedicated manner analogous to an ASIC. Therefore, the FPGA circuitry 700 may perform the operations corresponding to the some or all of the machine readable instructions of FIGS. 3 and 4 faster than the general purpose microprocessor can execute the same.

In the example of FIG. 7, the FPGA circuitry 700 is structured to be programmed (and/or reprogrammed one or more times) by an end user by a hardware description language (HDL) such as Verilog. The FPGA circuitry 700 of FIG. 7, includes example input/output (I/O) circuitry 702 to obtain and/or output data to/from example configuration circuitry 704 and/or external hardware 706. For example, the configuration circuitry 704 may be implemented by interface circuitry that may obtain machine readable instructions to configure the FPGA circuitry 700, or portion(s) thereof. In some such examples, the configuration circuitry 704 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 706 may be implemented by external hardware circuitry. For example, the external hardware 706 may be implemented by the microprocessor 600 of FIG. 6. The FPGA circuitry 700 also includes an array of example logic gate circuitry 708, a plurality of example configurable interconnections 710, and example storage circuitry 712. The logic gate circuitry 708 and the configurable interconnections 710 are configurable to instantiate one or more operations that may correspond to at least some of the machine readable instructions of FIGS. 3 and 4 and/or other desired operations. The logic gate circuitry 708 shown in FIG. 7 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 708 to enable configuration of the electrical structures and/or the logic gates to form circuits to perform desired operations. The logic gate circuitry 708 may include other electrical structures such as look-up tables (LUTs), registers (e.g., flip-flops or latches), multiplexers, etc.

The configurable interconnections 710 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 708 to program desired logic circuits.

The storage circuitry 712 of the illustrated example is structured to store result(s) of the one or more of the operations performed by corresponding logic gates. The storage circuitry 712 may be implemented by registers or the like. In the illustrated example, the storage circuitry 712 is distributed amongst the logic gate circuitry 708 to facilitate access and increase execution speed.

The example FPGA circuitry 700 of FIG. 7 also includes example Dedicated Operations Circuitry 714. In this example, the Dedicated Operations Circuitry 714 includes special purpose circuitry 716 that may be invoked to implement commonly used functions to avoid the need to program those functions in the field. Examples of such special purpose circuitry 716 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 700 may also include example general purpose programmable circuitry 718 such as an example CPU 720 and/or an example DSP 722. Other general purpose programmable circuitry 718 may additionally or alternatively be present such as a GPU, an XPU, etc., that can be programmed to perform other operations.

Although FIGS. 6 and 7 illustrate two example implementations of the processor circuitry 512 of FIG. 5, many other approaches are contemplated. For example, as mentioned above, modern FPGA circuitry may include an on-board CPU, such as one or more of the example CPU 720 of FIG. 7. Therefore, the processor circuitry 512 of FIG. 5 may additionally be implemented by combining the example microprocessor 600 of FIG. 5 and the example FPGA circuitry 700 of FIG. 7. In some such hybrid examples, a first portion of the machine readable instructions represented by the flowcharts of FIGS. 3 and 4 may be executed by one or more of the cores 602 of FIG. 6, a second portion of the machine readable instructions represented by the flowcharts of FIGS. 3 and 4 may be executed by the FPGA circuitry 700 of FIG. 7, and/or a third portion of the machine readable instructions represented by the flowcharts of FIGS. 3 and 4 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 512 of FIG. 5 may be in one or more packages. For example, the microprocessor 600 of FIG. 6 and/or the FPGA circuitry 700 of FIG. 7 may be in one or more packages. In some examples, an XPU may be implemented by the processor circuitry 512 of FIG. 5, which may be in one or more packages. For example, the XPU may include a CPU in one package, a DSP in another package, a GPU in yet another package, and an FPGA in still yet another package.

Figure 8:
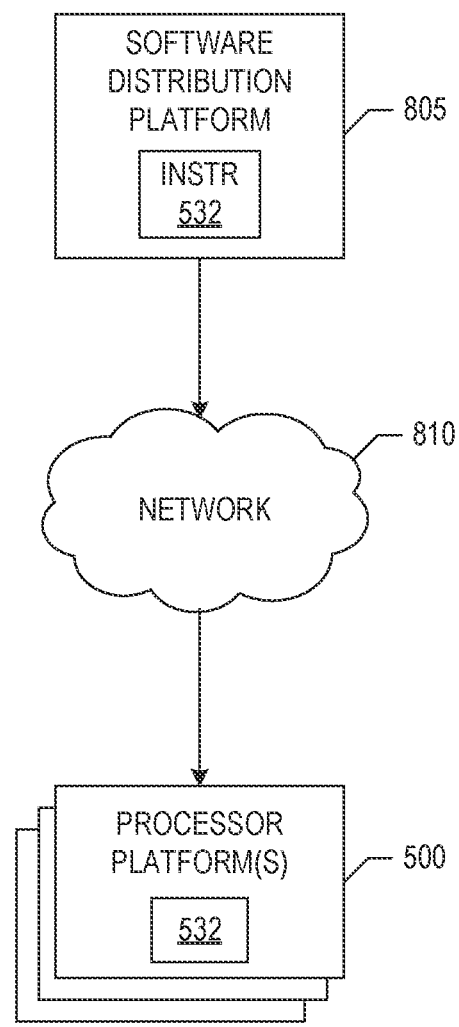
FIG. 8 is a block diagram of an example software distribution platform (e.g., one or more servers) to distribute software (e.g., software corresponding to the example machine readable instructions of FIGS. 3 and 4) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 805 to distribute software such as the example machine readable instructions 532 of FIG. 5 to hardware devices owned and/or operated by third parties is illustrated in FIG. 8. The example software distribution platform 805 may be implemented by any computer server, data facility, cloud service, etc., capable of storing and transmitting software to other computing devices. The third parties may be customers of the entity owning and/or operating the software distribution platform 805. For example, the entity that owns and/or operates the software distribution platform 805 may be a developer, a seller, and/or a licensor of software such as the example machine readable instructions 532 of FIG. 5. The third parties may be consumers, users, retailers, OEMs, etc., who purchase and/or license the software for use and/or re-sale and/or sub-licensing. In the illustrated example, the software distribution platform 805 includes one or more servers and one or more storage devices. The storage devices store the machine readable instructions 532, which may correspond to the example machine readable instructions 300 and 400 of FIGS. 3 and 4, as described above. The one or more servers of the example software distribution platform 805 are in communication with an example network 810, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 532 from the software distribution platform 805. For example, the software, which may correspond to the example machine readable instructions 300 and/or 400 of FIGS. 3 and/or 4, may be downloaded to the example processor platform 500, which is to execute the machine readable instructions 532 to implement the unique elements identification circuitry 120 of FIG. 2. In some examples, one or more servers of the software distribution platform 805 periodically offer, transmit, and/or force updates to the software (e.g., the example machine readable instructions 532 of FIG. 5) to ensure improvements, patches, updates, etc., are distributed and applied to the software at the end user devices.

From the foregoing, it will be appreciated that example systems, methods, apparatus, and articles of manufacture have been disclosed that virtually estimate cardinality with global registers. Disclosed systems, methods, apparatus, and articles of manufacture improve the efficiency of using a computing device by decreasing the memory requirements to estimate the cardinality of large datasets, decreasing the memory requirements to estimate noise generated by access and use of a shared global register array among multiple entities, decreasing the time required to estimate the cardinality of large datasets, and decreasing the time required to estimate the noise described above. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to virtually estimate cardinality with global registers are disclosed herein. Further examples and combinations thereof include the following:

Example 1 includes an apparatus to virtually estimate cardinality with global registers, the apparatus comprising at least one memory, machine readable instructions, and processor circuitry to execute the machine readable instructions to at least assign subsets of a sample dataset to a shared global register array, the shared global register array having a first number of registers, the sample dataset selected from a reference dataset of media assets, identify a virtual register array from the shared global register array that includes data elements associated with a label value, the virtual register array including a second number of registers less than the first number of registers, determine a maximum rank value of the label value across the virtual register array, and calculate a cardinality estimate of the label value across the virtual register array based on the second number of registers and the maximum rank value.

Example 2 includes the apparatus of example 1, wherein the cardinality estimate is a first cardinality estimate, and the processor circuitry is to calculate a second cardinality estimate of the label value across the shared global register array based on the first cardinality estimate, the first number of registers, and the second number of registers.

Example 3 includes the apparatus of example 1, wherein the processor circuitry is to generate a first rank distribution array for the shared global register array.

Example 4 includes the apparatus of example 3, wherein the processor circuitry is to generate a second rank distribution array for the virtual register array.

Example 5 includes the apparatus of example 4, wherein the processor circuitry is to generate an estimated recovered rank distribution array for the label value based on the first rank distribution array and the second rank distribution array.

Example 6 includes the apparatus of example 5, wherein the processor circuitry is to determine an estimated cumulative distribution function for the label value based on the estimated recovered rank distribution array.

Example 7 includes the apparatus of example 6, wherein the processor circuitry is to determine the maximum rank value for the label value based on the estimated cumulative distribution function.

Example 8 includes At least one non-transitory machine readable storage medium comprising instructions that, when executed, cause processor circuitry to at least, assign subsets of a sample dataset to a shared global register array, the shared global register array having a first number of registers, the sample dataset selected from a reference dataset of media assets, identify a virtual register array from the shared global register array that includes data elements associated with a label value, the virtual register array including a second number of registers less than the first number of registers, determine a maximum rank value of the label value across the virtual register array, and calculate a cardinality estimate of the label value across the virtual register array based on the second number of registers and the maximum rank value.

Example 9 includes the at least one non-transitory machine readable storage medium of example 8, wherein the cardinality estimate is a first cardinality estimation, and the instructions cause the processor circuitry to calculate a second cardinality estimate of the label value across the shared global register array based on the first cardinality estimate, the first number of registers, and the second number of registers.

Example 10 includes the at least one non-transitory machine readable storage medium of example 8, wherein the instructions cause the processor circuitry to generate a first rank distribution array for the shared global register array.

Example 11 includes the at least one non-transitory machine readable storage medium of example 10, wherein the instructions cause the processor circuitry to generate a second rank distribution array for the virtual register array.

Example 12 includes the at least one non-transitory machine readable storage medium of example 11, wherein the instructions cause the processor circuitry to generate an estimated recovered rank distribution array for the label value based on the first rank distribution array and the second rank distribution array.

Example 13 includes the at least one non-transitory machine readable storage medium of example 12, wherein the instructions cause the processor circuitry to determine an estimated cumulative distribution function for the label value based on the estimated recovered rank distribution array.

Example 14 includes the at least one non-transitory machine readable storage medium of example 13, wherein the instructions cause the processor circuitry to determine the maximum rank value for the label value based on the estimated cumulative distribution function.

Example 15 includes a method to virtually estimate cardinality with global registers, the method comprising assigning subsets of a sample dataset to a shared global register array, the shared global register array having a first number of registers, the sample dataset selected from a reference dataset of media assets, identifying a virtual register array from the shared global register array that includes data elements associated with a label value, the virtual register array including a second number of registers less than the first number of registers, determining a maximum rank value of the label value across the virtual register array, and calculating a cardinality estimate of the label value across the virtual register array based on the second number of registers and the maximum rank value.

Example 16 includes the method of example 15, wherein the cardinality estimate is a first cardinality estimate, further including calculating a second cardinality estimate of the label value across the shared global register array based on the first cardinality estimate, the first number of registers, and the second number of registers.

Example 17 includes the method of example 15, further including generating a first rank distribution array for the shared global register array.

Example 18 includes the method of example 17, further including generating a second rank distribution array for the virtual register array.

Example 19 includes the method of example 18, further including generating an estimated recovered rank distribution array for the label value based on the first rank distribution array and the second rank distribution array.

Example 20 includes the method of example 19, further including determining an estimated cumulative distribution function for the label value based on the estimated recovered rank distribution array.

Example 21 includes the method of example 20, further including determining the maximum rank value for the label value based on the estimated cumulative distribution function.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to virtually estimate cardinality with global registers, the apparatus comprising:
   at least one memory;
   machine readable instructions; and
   one or more processors configured to execute the machine readable instructions to at least:
   assign subsets of a sample dataset to a shared global register array, the shared global register array having a first number of registers, the sample dataset selected from a reference dataset of media assets;

identify a virtual register array from the shared global register array that includes data elements associated with a label value, the virtual register array including a second number of registers less than the first number of registers;

determine a maximum rank value of the label value across the virtual register array; and calculate a cardinality estimate of the label value across the virtual register array based on the second number of registers and the maximum rank value.

2. The apparatus of claim 1, wherein the cardinality estimate is a first cardinality estimate, and the one or more processors are configured to calculate a second cardinality estimate of the label value across the shared global register array based on the first cardinality estimate, the first number of registers, and the second number of registers.

3. The apparatus of claim 1, wherein the one or more processors are configured to generate a first rank distribution array for the shared global register array.

4. The apparatus of claim 3, wherein the one or more processors are configured to generate a second rank distribution array for the virtual register array.

5. The apparatus of claim 4, wherein the one or more processors are configured to generate an estimated recovered rank distribution array for the label value based on the first rank distribution array and the second rank distribution array.

6. The apparatus of claim 5, wherein the one or more processors are configured to determine an estimated cumulative distribution function for the label value based on the estimated recovered rank distribution array.

7. The apparatus of claim 6, wherein the one or more processors are configured to determine the maximum rank value for the label value based on the estimated cumulative distribution function.

8. At least one non-transitory machine readable storage medium comprising instructions that, when executed, cause one or more processors to at least assign subsets of a sample dataset to a shared global register array, the shared global register array having a first number of registers, the sample dataset selected from a reference dataset of media assets;

identify a virtual register array from the shared global register array that includes data elements associated with a label value, the virtual register array including a second number of registers less than the first number of registers;

determine a maximum rank value of the label value across the virtual register array; and calculate a cardinality estimate of the label value across the virtual register array based on the second number of registers and the maximum rank value.

9. The at least one non-transitory machine readable storage medium of claim 8, wherein the cardinality estimate is a first cardinality estimation, and the instructions cause the one or more processors to calculate a second cardinality estimate of the label value across the shared global register array based on the first cardinality estimate, the first number of registers, and the second number of registers.

10. The at least one non-transitory machine readable storage medium of claim 8, wherein the instructions cause the one or more processors to generate a first rank distribution array for the shared global register array.

11. The at least one non-transitory machine readable storage medium of claim 10, wherein the instructions cause the one or more processors to generate a second rank distribution array for the virtual register array.

12. The at least one non-transitory machine readable storage medium of claim 11, wherein the instructions cause the one or more processors to generate an estimated recovered rank distribution array for the label value based on the first rank distribution array and the second rank distribution array.

13. The at least one non-transitory machine readable storage medium of claim 12, wherein the instructions cause the one or more processors to determine an estimated cumulative distribution function for the label value based on the estimated recovered rank distribution array.

14. The at least one non-transitory machine readable storage medium of claim 13, wherein the instructions cause the one or more processors to determine the maximum rank value for the label value based on the estimated cumulative distribution function.

15. A method to virtually estimate cardinality with global registers, the method comprising:

assigning subsets of a sample dataset to a shared global register array, the shared global register array having a first number of registers, the sample dataset selected from a reference dataset of media assets;

identifying a virtual register array from the shared global register array that includes data elements associated with a label value, the virtual register array including a second number of registers less than the first number of registers;

determining a maximum rank value of the label value across the virtual register array; and calculating a cardinality estimate of the label value across the virtual register array based on the second number of registers and the maximum rank value.

16. The method of claim 15, wherein the cardinality estimate is a first cardinality estimate, further including calculating a second cardinality estimate of the label value across the shared global register array based on the first cardinality estimate, the first number of registers, and the second number of registers.

17. The method of claim 15, further including generating a first rank distribution array for the shared global register array.

18. The method of claim 17, further including generating a second rank distribution array for the virtual register array.

19. The method of claim 18, further including generating an estimated recovered rank distribution array for the label value based on the first rank distribution array and the second rank distribution array.

20. The method of claim 19, further including determining an estimated cumulative distribution function for the label value based on the estimated recovered rank distribution array.

21. The method of claim 20, further including determining the maximum rank value for the label value based on the estimated cumulative distribution function.

* * * * *